United States Patent
Zhang et al.

(10) Patent No.: US 12,532,321 B2
(45) Date of Patent: Jan. 20, 2026

(54) PARAMETER SWITCH PER SEMI-PERSISTENT SCHEDULING AND CONFIGURED GRANT OCCASION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 551 days.

(21) Appl. No.: 17/369,875

(22) Filed: Jul. 7, 2021

(65) Prior Publication Data
US 2023/0010875 A1 Jan. 12, 2023

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0003* (2013.01); *H04L 5/16* (2013.01); *H04W 72/1263* (2013.01); *H04L 5/0023* (2013.01)

(58) Field of Classification Search
CPC ... H04L 1/0003; H04L 1/0009; H04L 1/1861; H04L 1/1896; H04L 25/0224;
(Continued)

(56) References Cited

U.S. PATENT DOCUMENTS 6,665,276 B1 * 12/2003 Culbertson .............. H04B 1/44
370/282
10,749,660 B2 * 8/2020 Liu ....................... H04L 1/0026
(Continued)

FOREIGN PATENT DOCUMENTS

EP 3716521 A1 9/2020
WO 2020206573 A1 10/2020
(Continued)

OTHER PUBLICATIONS

Intel Corporation (R1-1717412 "On NR FDD"), 3GPP TSG RAN1 WG Meeting #90bis, R1-1717412, Prague, Czech Republic, Oct. 9-13, 2017, Total pp. 3 (Year: 2017).*
(Continued)

*Primary Examiner* — Shah M Rahman
(74) *Attorney, Agent, or Firm* — ArentFox Schiff, LLP

(57) ABSTRACT

Example aspects include a method, apparatus, and computer-readable medium for wireless communication at a user equipment (UE) of a wireless communication network, comprising receiving, from a base station, configuration information scheduling one or more receive occasions and one or more transmit occasions. A full-duplex portion of an overlapping occasion comprises a portion of a first receive occasion of the one or more receive occasions overlapping with a portion of a first transmit occasion of the one or more transmit occasions. A half-duplex portion of the overlapping occasion comprises a remaining portion of the first receive occasion or a remaining portion of the first transmit occasion. The aspects further include performing full-duplex communications during the full-duplex portion of the overlapping occasion using overlapping full-duplex associated parameters. Additionally, the aspects further include performing half-duplex communications during the half-duplex
(Continued)

portion of the overlapping occasion using non-overlapping half-duplex associated parameters.

26 Claims, 16 Drawing Sheets

(51) Int. Cl.
  *H04L 5/16* (2006.01)
  *H04W 72/1263* (2023.01)
  *H04L 5/00* (2006.01)
(58) Field of Classification Search
  CPC ..... H04L 5/001; H04L 5/0023; H04L 5/0028; H04L 5/0055; H04L 5/0091; H04L 5/1438; H04L 5/16; H04W 72/1263; H04W 72/23
  See application file for complete search history.

(56) References Cited

U.S. PATENT DOCUMENTS

| | | | | |
|---|---|---|---|---|
| 2009/0296609 | A1* | 12/2009 | Choi | H04L 5/14 370/281 |
| 2016/0100422 | A1* | 4/2016 | Papasakellariou | H04L 1/1822 370/329 |
| 2017/0207889 | A1* | 7/2017 | Mizusawa | H04W 72/0446 |
| 2017/0272221 | A1* | 9/2017 | Yi | H04W 16/14 |
| 2017/0302337 | A1 | 10/2017 | Liu et al. | |
| 2017/0359161 | A1* | 12/2017 | Montojo | H04L 5/0092 |
| 2018/0098291 | A1* | 4/2018 | Fodor | H04W 52/346 |
| 2018/0288789 | A1* | 10/2018 | Wang | H04W 72/566 |
| 2019/0068355 | A1* | 2/2019 | Ode | H04W 72/0446 |
| 2019/0098662 | A1* | 3/2019 | Aijaz | H04W 74/0808 |
| 2019/0140811 | A1* | 5/2019 | Abedini | H04L 5/14 |
| 2019/0357149 | A1* | 11/2019 | Zhang | H04W 52/146 |
| 2020/0313837 | A1* | 10/2020 | Vejlgaard | H04W 72/541 |
| 2022/0029761 | A1* | 1/2022 | Su | H04L 27/2613 |
| 2022/0110072 | A1* | 4/2022 | Zhang | H04L 5/16 |
| 2022/0159580 | A1* | 5/2022 | Su | H04W 52/367 |
| 2022/0200777 | A1* | 6/2022 | Lee | H04W 72/0453 |
| 2022/0216976 | A1* | 7/2022 | Zhang | H04B 17/327 |
| 2022/0330312 | A1* | 10/2022 | Zhou | H04L 1/1819 |
| 2022/0386146 | A1* | 12/2022 | Lee | H04B 17/0085 |
| 2023/0060894 | A1* | 3/2023 | Rastegardoost | H04W 56/001 |
| 2023/0337213 | A1* | 10/2023 | Badic | G05D 1/467 |
| 2024/0040648 | A1* | 2/2024 | Askar | H04W 76/15 |

FOREIGN PATENT DOCUMENTS

WO  WO-2021225197 A1 * 11/2021
WO     2022076308        4/2022

OTHER PUBLICATIONS

International Search Report and Written Opinion—PCT/US2022/073037—ISA/EPO—Sep. 28, 2022.

* cited by examiner

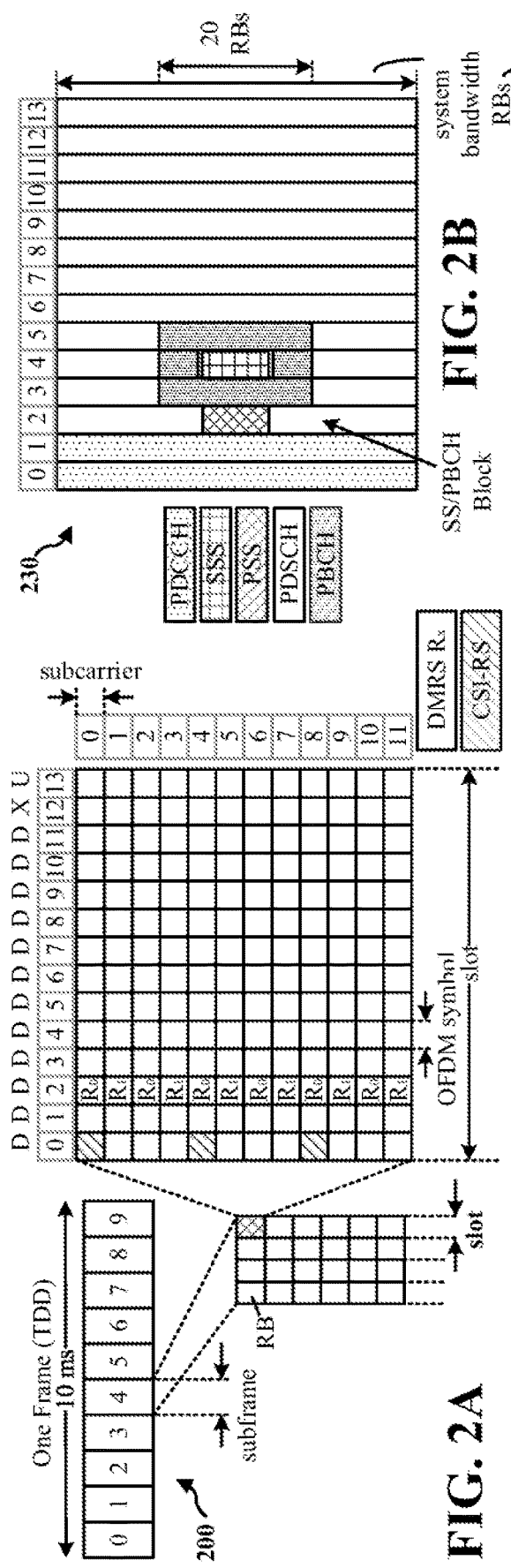
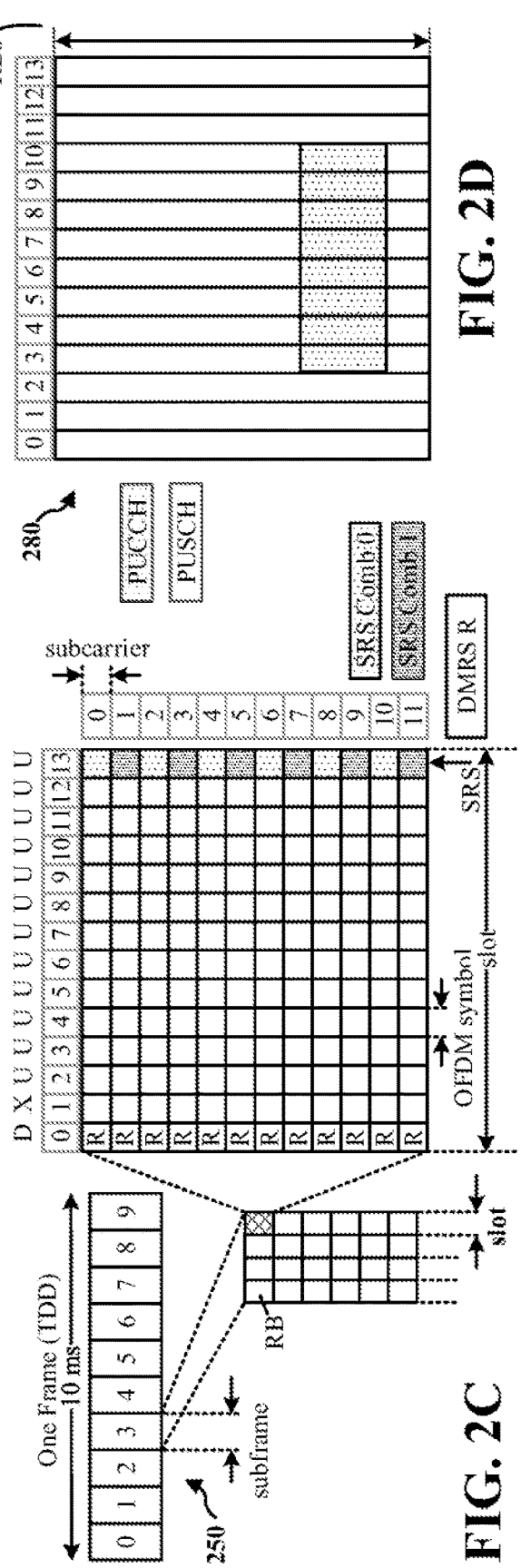
FIG. 2A
FIG. 2B
FIG. 2C
FIG. 2D

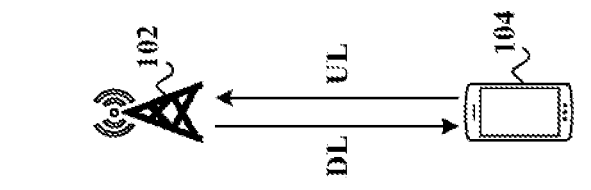
FIG. 4C
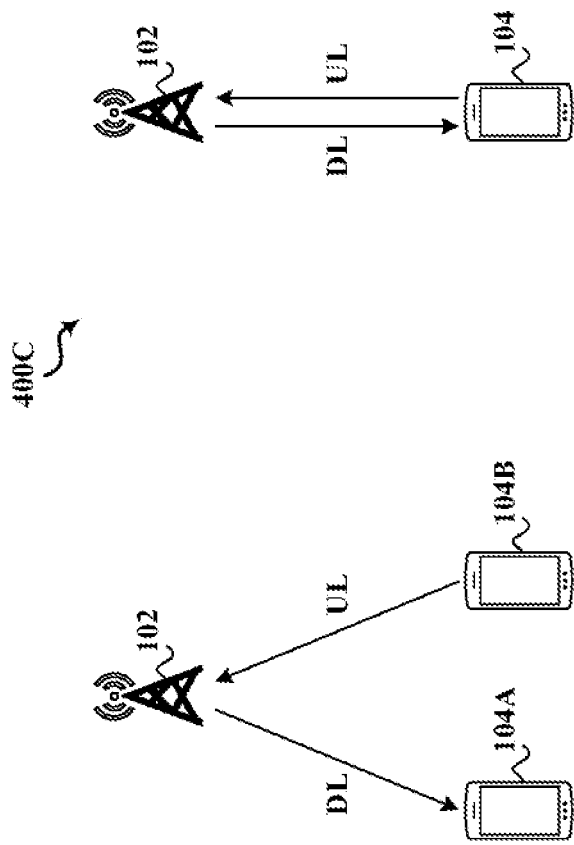
FIG. 4B
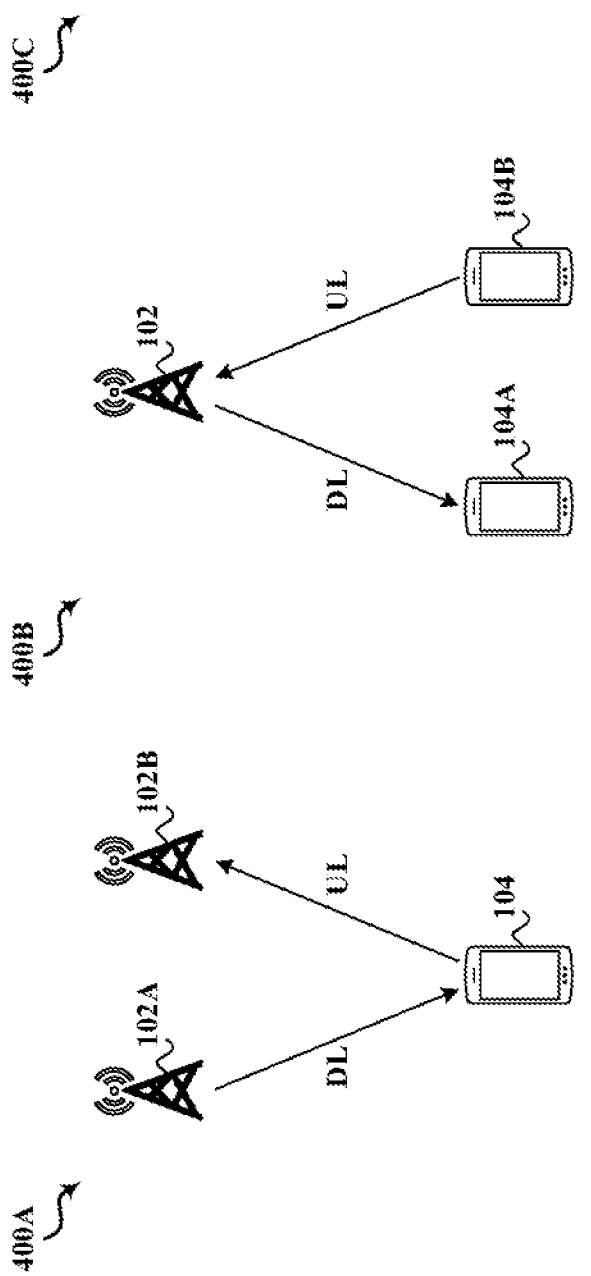
FIG. 4A
FIG. 4D

PARAMETER SWITCH PER SEMI-PERSISTENT SCHEDULING AND CONFIGURED GRANT OCCASION

INTRODUCTION

The described aspects relate generally to wireless communication systems, and more particularly, to apparatuses and methods for performing parameter switching during full-duplex and half-duplex overlapping occasions.

Wireless communication systems are widely deployed to provide various telecommunication services such as telephony, video, data, messaging, and broadcasts. The wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of wireless communication by a user equipment (UE) of a wireless communication network, comprising receiving, from a base station, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The method further includes performing full-duplex communications during the full-duplex portion of the overlapping occasion using overlapping full-duplex associated parameters. Additionally, the method further includes performing half-duplex communications during the half-duplex portion of the overlapping occasion using non-overlapping half-duplex associated parameters. The overlapping full-duplex associated parameters differ from the non-overlapping half-duplex associated parameters.

Another example aspect includes an apparatus of wireless communication by a UE of a wireless communication network, comprising a memory and a processor coupled with the memory. The memory and the processor are configured to receive, from a base station, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The memory and the processor are further configured to perform full-duplex communications during the full-duplex portion of the overlapping occasion using overlapping full-duplex associated parameters. Additionally, the memory and the processor are further configured to perform half-duplex communications during the half-duplex portion of the overlapping occasion using non-overlapping half-duplex associated parameters. The overlapping full-duplex associated parameters differ from the non-overlapping half-duplex associated parameters.

An example aspect includes a method of wireless communication by a user equipment (UE) of a wireless communication network, comprising means for receiving, from a base station, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The apparatus further includes means for performing full-duplex communications during the full-duplex portion of the overlapping occasion using overlapping full-duplex associated parameters. Additionally, the apparatus further includes means for performing half-duplex communications during the half-duplex portion of the overlapping occasion using non-overlapping half-duplex associated parameters. The overlapping full-duplex associated parameters differ from the non-overlapping half-duplex associated parameters.

Another example aspect includes a computer-readable medium (e.g., non-transitory computer-readable medium) storing instructions for wireless communication by a UE of a wireless communication network, executable by a processor, to receive, from a base station, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The instructions are further executable to perform full-duplex communications during the full-duplex portion of the overlapping occasion using overlapping full-duplex associated parameters. Additionally, the instructions are further executable to perform half-duplex communications during the half-duplex portion of the overlapping occasion using non-overlapping half-duplex associated parameters. The overlapping full-duplex associated parameters differ from the non-overlapping half-duplex associated parameters.

Another example aspect includes a method of wireless communication by a network node of a wireless communication network, comprising transmitting, to a UE, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The method further includes performing full-duplex communications during the full-duplex portion of the overlapping occasion using overlapping full-duplex associated parameters. Additionally, the method further includes performing half-duplex communications during the half-duplex portion of the overlapping occasion using non-overlapping half-duplex associated parameters. The overlapping full-duplex associated parameters differ from the non-overlapping half-duplex associated parameters.

Another example aspect includes an apparatus of wireless communication by a network node of a wireless communication network, comprising a memory and a processor coupled with the memory. The memory and the processor are configured to transmit, to a UE, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The memory and the processor are further configured to perform full-duplex communications during the full-duplex portion of the overlapping occasion using overlapping full-duplex associated parameters. Additionally, the memory and the processor are further configured to perform half-duplex communications during the half-duplex portion of the overlapping occasion using non-overlapping half-duplex associated parameters. The overlapping full-duplex associated parameters differ from the non-overlapping half-duplex associated parameters.

Another example aspect includes a method of wireless communication by a network node of a wireless communication network, comprising means for transmitting, to a UE, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The apparatus further includes means for performing full-duplex communications during the full-duplex portion of the overlapping occasion using overlapping full-duplex associated parameters. Additionally, the apparatus further includes means for performing half-duplex communications during the half-duplex portion of the overlapping occasion using non-overlapping half-duplex associated parameters. The overlapping full-duplex associated parameters differ from the non-overlapping half-duplex associated parameters.

Another example aspect includes a computer-readable medium (e.g., non-transitory computer-readable medium) storing instructions for wireless communication by a network node of a wireless communication network, executable by a processor, to transmit, to a UE, configuration information scheduling one or more receive occasions for the UE and one or more transmit occasions for the UE. The one or more receive occasions comprise a first receive occasion. The one or more transmit occasions comprise a first transmit occasion. A full-duplex portion of an overlapping occasion comprises a portion of the first receive occasion overlapping with a portion of the first transmit occasion. A half-duplex portion of the overlapping occasion comprises a remaining portion of the first receive occasion or a remaining portion of the first transmit occasion. The instructions are further executable to perform full-duplex communications during the full-duplex portion of the overlapping occasion using overlapping full-duplex associated parameters. Additionally, the instructions are further executable to perform half-duplex communications during the half-duplex portion of the overlapping occasion using non-overlapping half-duplex associated parameters. The overlapping full-duplex associated parameters differ from the non-overlapping half-duplex associated parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 4A is a diagram illustrating a first example of full-duplex communications, in accordance with various aspects of the present disclosure.

FIG. 4B is a diagram illustrating a second example of full-duplex communications, in accordance with various aspects of the present disclosure.

FIG. 4C is a diagram illustrating a third example of full-duplex communications, in accordance with various aspects of the present disclosure.

FIG. 4D is a diagram illustrating full-duplex configurations of wireless devices, in accordance with various aspects of the present disclosure.

DETAILED DESCRIPTION

Figure 1:
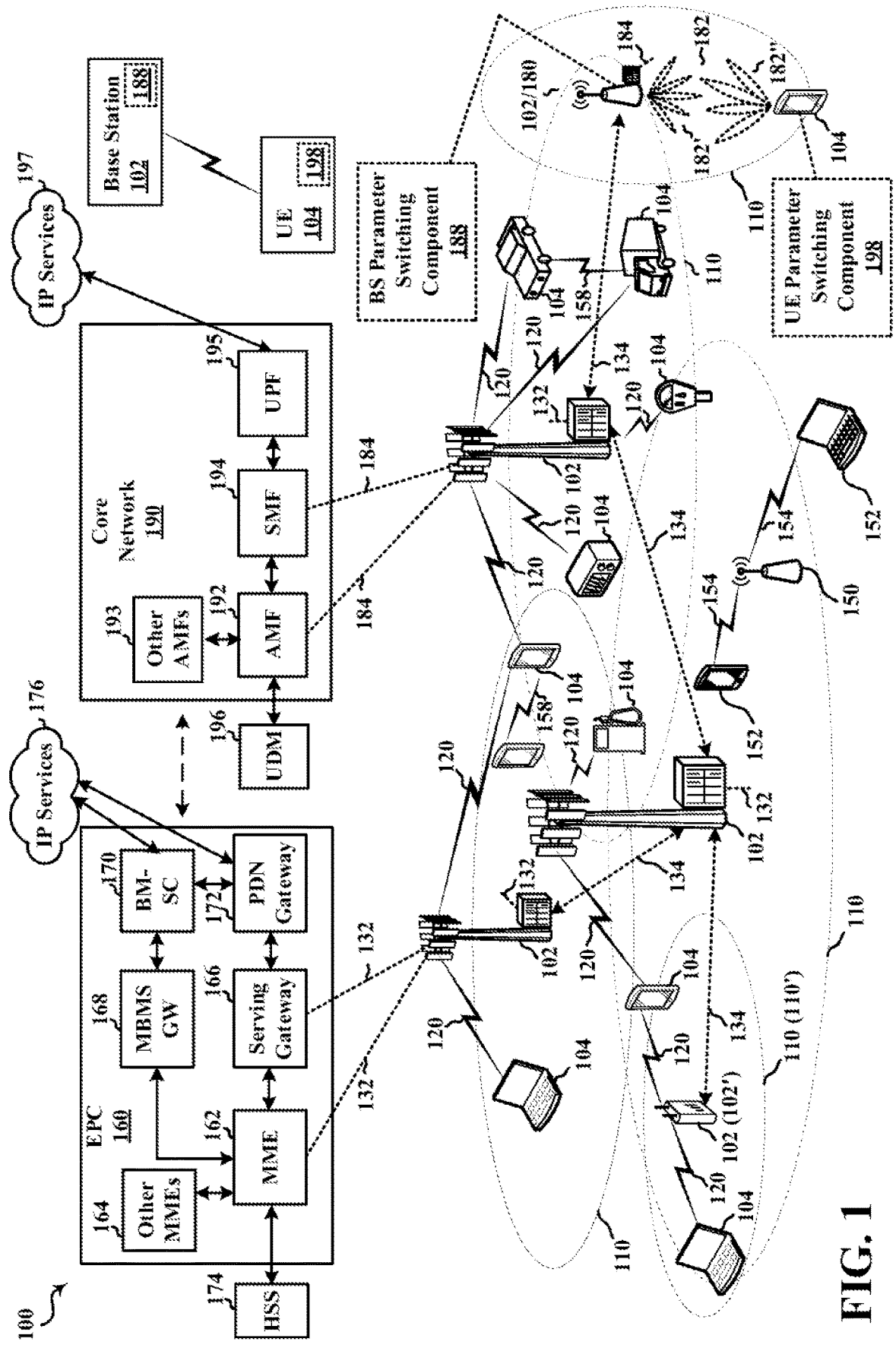
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems may implement full-duplex communications. That is, in some aspects, wireless devices of these wireless communication systems performing full-duplex communications may perform simultaneous (e.g., during at least a portion of a same time period) downlink and uplink communications (e.g., transmissions, receptions). The full-duplex communications may comprise dynamic traffic and/or semi-static traffic. Dynamic traffic may generally refer to dynamically-scheduled communications that may generally be aperiodic and/or scheduled on an as-needed basis. Semi-static traffic may generally refer to regularly occurring (e.g., periodic) communications using a pattern that may continue until modified or released. In some aspects, a wireless device (e.g., user equipment (UE)) may need to switch from a full-duplex communication configuration to a half-duplex communication configuration during a scheduled occasion. For example, the wireless device may receive configuration information scheduling an occasion comprising a full-duplex portion and a half-duplex portion. However, in some aspects, configuration procedures may not provide support for such switching. Thus, potentially reducing efficiency and performance of full-duplex communications.

Aspects presented herein provide for multiple manners for configuring and scheduling semi-static full-duplex communications. In some aspects, a network device (e.g., base station) may transmit configuration information to a UE that may configure one or more receive occasions for the UE and one or more transmit occasions for the UE. For example, the configuration information may schedule one or more overlapping occasions comprising a receive occasion and a transmit occasion. That is, at least a portion of each overlapping occasion may comprise full-duplex communications between the network device and the UE. Alternatively or additionally, a remaining portion of each overlapping occasion may comprise half-duplex communications between the network device and the UE. As such, the UE may be configured to perform parameter switching during the one or more overlapping occasions to switch between the full-duplex communications and the half-duplex communications. Further, aspects presented herein may potentially reduce latency, increase spectrum efficiency, and increase resource utilization, by allowing for reception and/or transmission of signals during a same scheduled occasion.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a base station (BS) parameter switching component 188. The BS parameter switching component 188 may be configured to schedule and configure semi-static full-duplex communications. For example, the BS parameter switching component 188 may transmit configuration information scheduling one or more receive occasions for a UE and one or more transmit occasions for the UE.

Similarly, the UE 104 may include a UE parameter switching component 198. The UE parameter switching component 198 may be configured to perform semi-static full-duplex communications. For example, the UE parameter switching component 198 may receive configuration information scheduling one or more receive occasions for the UE and one or more transmit occasions for the UE.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunication System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
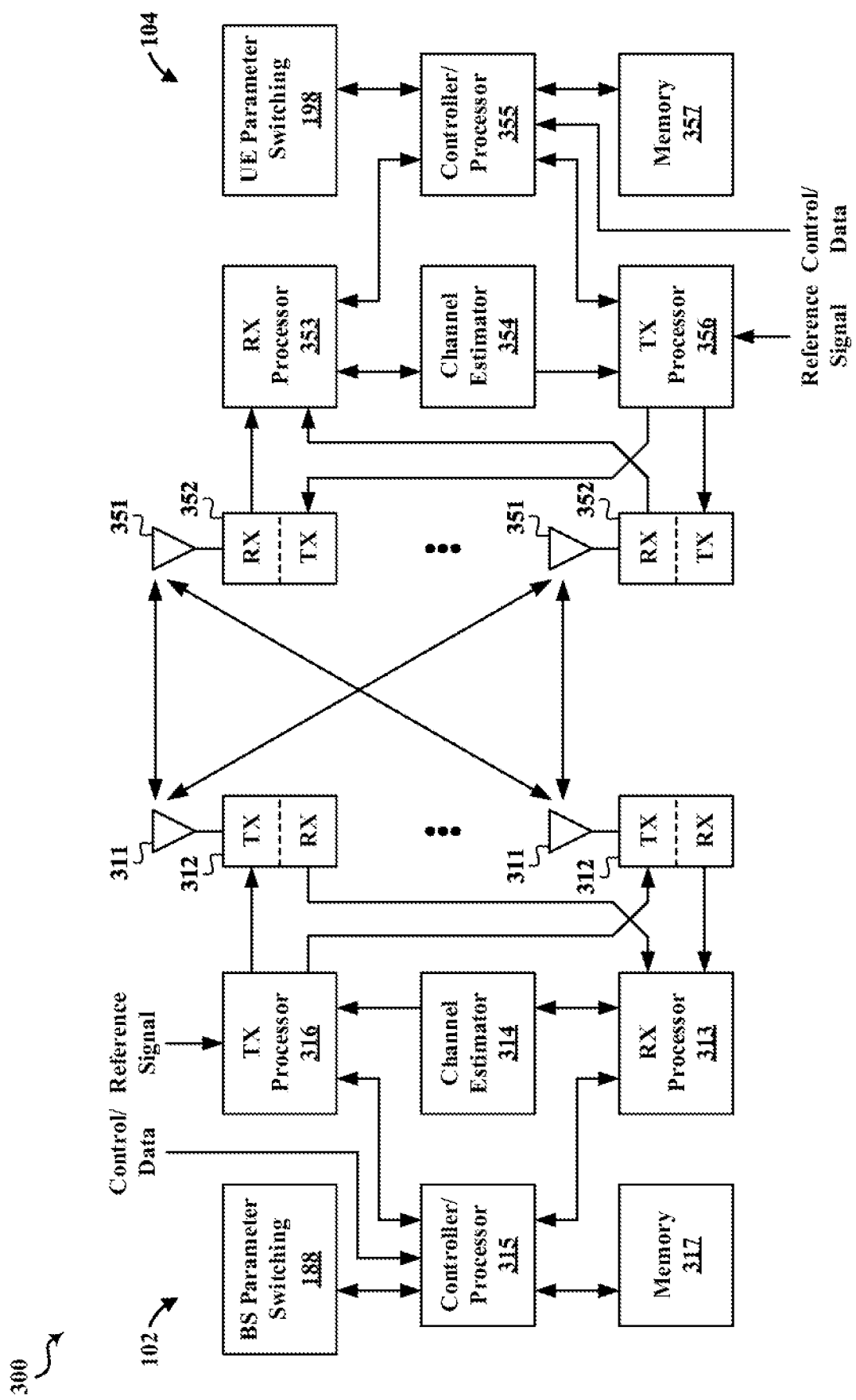
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network 100. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS parameter switching component 188. The BS parameter switching component 188 may be configured to schedule and configure semi-static full-duplex communications. For example, the BS parameter switching component 188 may transmit configuration information scheduling one or more receive occasions for the UE 104 and one or more transmit occasions for the UE 104.

In other aspects, at least one of the TX processor 316, the RX processor 313, and the controller/processor 315 may be configured to perform aspects in connection with the BS parameter switching component 188 of FIG. 1. For example, the memory 317 may store computer-executable instructions defining the BS parameter switching component 188. In other aspects, the TX processor 316, the RX processor 313, and/or the controller/processor 315 may be configured to execute the BS parameter switching component 188.

In some aspects, the UE 104 may include a UE parameter switching component 198. The UE parameter switching component 198 may be configured to perform semi-static full-duplex communications. For example, the UE parameter switching component 198 may receive configuration information scheduling one or more receive occasions for the UE 104 and one or more transmit occasions for the UE 104.

In other aspects, at least one of the TX processor 356, the RX processor 353, and the controller/processor 355 may be configured to perform aspects in connection with the UE parameter switching component 198 of FIG. 1. For example, the memory 357 may store computer-executable instructions defining the UE parameter switching component 198. In other aspects, the TX processor 356, the RX processor 353, and/or the controller/processor 355 may be configured to execute the UE parameter switching component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Wireless communication systems may implement full-duplex communications in addition to half-duplex communications. That is, in some aspects, wireless devices of these wireless communication systems performing full-duplex communications may perform simultaneous (e.g., during at least a portion of a same time period) downlink and uplink communications (e.g., transmissions, receptions). For example, a network device (e.g., base station, gNodeB (gNB), transmit reception point (TRP)) may simultaneously receive uplink communications (e.g., from a UE) using a receive beam of an antenna panel (e.g., antenna 311 of FIG. 3) of the network device and transmit downlink communications (e.g., to a UE) using a transmit beam of another antenna panel. In another example, a UE may simultaneously receive downlink communications (e.g., from a network device) using a receive beam of an antenna panel (e.g., antenna 351 of FIG. 3) and transmit uplink communications (e.g., to a network device) using a transmit beam of another antenna panel. In other aspects, the network devices may utilize full-duplex communications to implement wireless backhaul links between network devices of an integrated access and backhaul (IAB) network. For example, the network devices may provide access to a core network via the wireless backhaul links of the IAB network. Alternatively or additionally, the wireless devices may perform half-duplex communications in which either downlink or uplink communications are performed consecutively in time.

In some aspects, a wireless device may use a beam pair (e.g., one transmit beam and one receive beam) to perform the full-duplex communications. That is, the transmit beam of the beam pair may simultaneously transmit an output signal as the receive beam of the beam pair may be receiving an input signal. Under certain channel conditions, a portion of the output signal may additionally be received by the receive beam. The portion of the output signal that is received by the receive beam may generally be referred to as self-interference. In some aspects, the self-interference may be caused by a portion of the transmit beam overlapping a portion of the receive beam. That is, in such aspects, a beam separation of the beam pair may not be sufficient to prevent self-interference. In other aspects, the self-interference may be caused by local coupling between the transmit antenna and the receive antenna of the wireless device. Alternatively or additionally, the self-interference may be caused by reflections of the transmitted output signal from objects (e.g., trees, buildings, vehicles, etc.) in the transmission environment. Such reflections may generally be referred to as clutter echo.

As a result, a full-duplex capability of a wireless device may be conditioned on and/or limited by several performance factors, such as beam separation, self-interference, clutter echo, and the like. For example, the beam pair used for the full-duplex communications may require that one or more performance factors meet corresponding predefined thresholds, and, as such, may provide sufficient performance for the full duplex communications. For example, the beam pair may need a beam separation that exceeds a minimum beam separation threshold. That is, if or when the beam separation of the beam pair does not exceed the minimum beam separation threshold, a resulting self-interference level may be such that the input signal may not be received and/or decoded successfully.

In another example, the beam pair may need a self-interference level that is lower than a maximum self-interference threshold. That is, if or when the self-interference level exceeds the maximum self-interference threshold, the input signal may not be received and/or decoded successfully. In another example, the beam pair may need a clutter echo interference level that is lower than a maximum clutter echo threshold. That is, if or when the clutter echo interference level exceeds the maximum clutter echo threshold, the input signal may not be received and/or decoded successfully.

Advantageously, full-duplex communications may reduce latency, increase spectrum efficiency, and increase resource utilization when compared to half-duplex communications.

Referring to FIGS. 4A-4D, the diagrams illustrate examples of different configurations that may be used for full-duplex communications between wireless devices of a wireless communication system. The wireless communication systems 400A-C (hereinafter "400") depicted in FIGS. 4A-4C, respectively, may be similar in many respects to the wireless communication system and the access network 100 described above with reference to FIG. 1 and may include additional features not mentioned above. Some of the elements of the wireless communication system and the access network 100 described above have been omitted for the sake of simplicity.

The network devices (e.g., 102, 102A, 102B, hereinafter "102") depicted in FIGS. 4A-4C may be similar in many respects to the network devices (e.g., base station 102, gNB 180, TRP 102/180) described above in reference to FIGS. 1 and 3, and may include additional features not mentioned above. The network devices 102 may comprise a BS parameter switching component 188 (shown in FIG. 1). The UEs (e.g., 104, 104A, 104B, hereinafter "104") depicted in FIGS. 4A-4C may be similar in many respects to the UE 104 described above in reference to FIGS. 1 and 3, and may include additional features not mentioned above. The UEs 104 may comprise a UE parameter switching component 198 (shown in FIG. 1).

FIG. 4A illustrates wireless communication system 400A with a first example configuration of full-duplex communications. For example, the UE 104 may be configured to perform full-duplex communications with a first network device 102A and a second network device 102B. That is, the UE 104 may be configured to simultaneously receive downlink transmissions from the first network device 102A and to transmit uplink transmissions to the network device 102B. For example, the UE 104 may simultaneously receive downlink transmissions from the first network device 102A using a receive beam of an antenna panel of the UE 104 and transmit uplink transmissions to the second network device 102B using a transmit beam of another antenna panel of the UE 104. Alternatively or additionally, the network device 102A and the network device 102B may be configured to perform half-duplex communications with the UE 104. That is, the network device 102A may transmit downlink transmissions to the UE 104 using a transmit beam of an antenna panel of the network device 102A, and the network device 102B may receive uplink transmissions from the UE 104 using a receive beam of an antenna panel of the network device 102B. Further, the half-duplex communications may not be simultaneous. For example, the downlink transmissions to the UE 104 and the uplink transmissions from the UE 104 may not overlap (e.g., occur during at least a portion of a same time period).

FIG. 4B illustrates wireless communication system 400B with a second example configuration of full-duplex communications. For example, the network device 102 may be configured to perform full-duplex communications with a first UE 104A and a second UE 104B. That is, the network device 102 may be configured to simultaneously transmit downlink transmissions to the first UE 104A and to receive uplink transmissions from the second UE 104B. For example, the network device 102 may simultaneously transmit downlink transmissions to the first UE 104A using a transmit beam of an antenna panel of the network device 102 and receive uplink transmissions from the second UE 104B using a receive beam of another antenna panel of the network device 102. Alternatively or additionally, the UE 104A and the UE 104B may be configured to perform half-duplex communications with the network device 102. That is, the UE 104A may receive downlink transmissions from the network device 102 using a receive beam of an antenna panel of the UE 104A, and the UE 104B may transmit uplink transmissions to the network device 102 using a transmit beam of an antenna panel of the UE 104B. Further, the half-duplex communications may not be simultaneous. For example, the downlink transmissions from the network device 102 and the uplink transmissions to the network device 102 may not overlap (e.g., occur during at least a portion of a same time period).

FIG. 4C illustrates wireless communication system 400C with a third example configuration of full-duplex communications. For example, the network device 102 may be configured to perform full-duplex communications with a UE 104. That is, the network device 102 may be configured to simultaneously transmit downlink transmissions to the UE 104 and to receive uplink transmissions from the UE 104. For example, the network device 102 may simultaneously transmit downlink transmissions to the UE 104 using a transmit beam of an antenna panel of the network device 102 and receive uplink transmissions from the UE 104 using a receive beam of another antenna panel of the network device 102. Alternatively or additionally, the UE 104 may simultaneously receive downlink transmissions from the network device 102 using a receive beam of an antenna panel of the UE 104 and transmit uplink transmissions to the second network device 102B using a transmit beam of another antenna panel of the UE 104. That is, the downlink transmissions from the network device 102 uplink transmissions to the second network device 102B may occur during at least a portion of a same time period.

FIG. 4D is a diagram 450 illustrating full-duplex configurations for the wireless devices of the wireless communication systems 400 as described above in reference to FIGS.

4A-4C. For example, a wireless communication system 400 may operate in a baseline (e.g., half-duplex) mode if or when the full-duplex (FD) mode of the network devices 102 is disabled and the full-duplex mode of the UEs 104 is disabled. That is, in such a baseline mode, the network devices 102 and the UEs 104 operate in half-duplex modes. In another example, that may be generally referred to as use case 1, the full-duplex mode of the network devices 102 is disabled and the full-duplex mode of the UEs 104 is enabled, as described above in reference to FIG. 4A. In another example, that may be generally referred to as use case 2, the full-duplex mode of the network devices 102 is enabled and the full-duplex mode of the UEs 104 is disabled, as described above in reference to FIG. 4B. In another example, that may be generally referred to as use case 1, the full-duplex mode of the network devices 102 is enabled and the full-duplex mode of the UEs 104 is enabled, as described above in reference to FIG. 4C.

It may be understood that the wireless communication systems 400 depicted in FIGS. 4A-4C are only three examples of wireless communication systems that may be utilized without departing from the scope described herein. For example, other network topologies comprising different amounts and/or configurations of network devices 102 and/or UEs 104 may be utilized.

Figure 5:
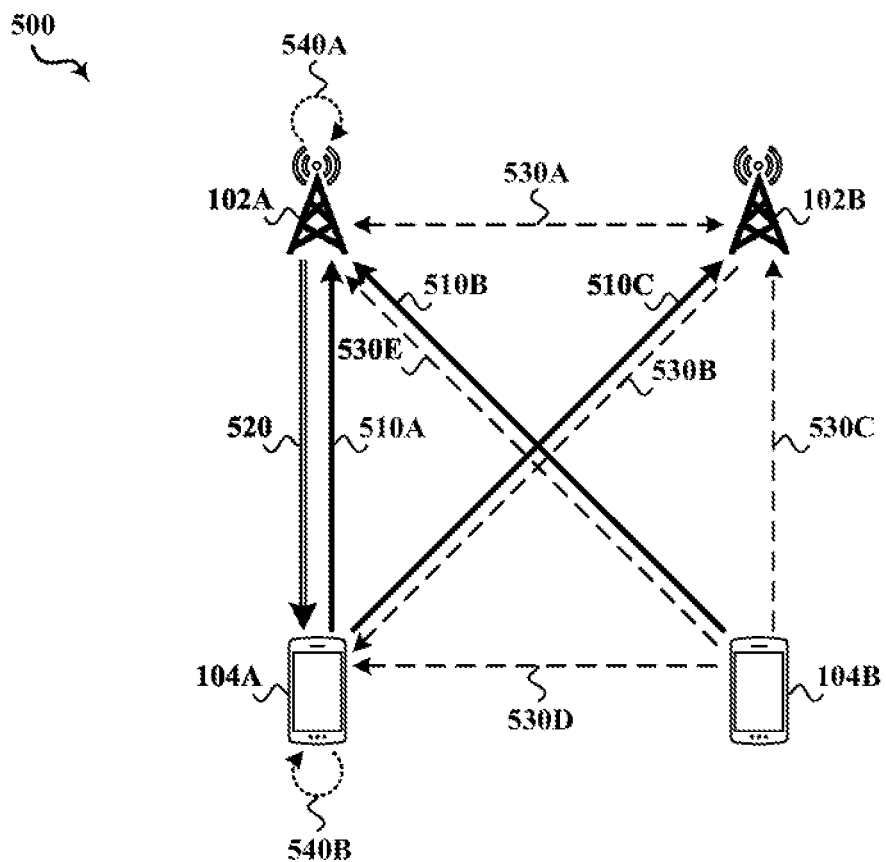
FIG. 5 is a diagram illustrating an example of a full-duplex wireless communication system, in accordance with various aspects of the present disclosure.

FIG. 5 illustrates an example of a full-duplex wireless communication system 500. The full-duplex wireless communication system 500 may comprise network devices 102A, 102B (hereinafter "102") and UEs 104A, 104B (hereinafter "104"). The full-duplex wireless communication system 500 may be similar in many respects to the wireless communication system and the access network 100 described above with reference to FIG. 1 and to the wireless communication systems 400 described above with reference to FIGS. 4A-4C and may include additional features not mentioned above. Some of the elements of the wireless communication systems described above have been omitted for the sake of simplicity.

The network devices 102 depicted in FIG. 5 may be similar in many respects to the network device (e.g., base station 102, gNB 180, TRP 102/180) described above in reference to FIGS. 1, 3, and 4A-4D, and may include additional features not mentioned above. The network devices 102 may comprise a BS parameter switching component 188 (shown in FIG. 1). The UEs depicted in FIG. 5 may be similar in many respects to the UE 104 described above in reference to FIGS. 1, 3, and 4A-4D, and may include additional features not mentioned above. The UEs 104 may comprise a UE parameter switching component 198 (shown in FIG. 1).

In some aspects, the UE 104A may be configured to operate in full-duplex mode (e.g., full-duplex mode is enabled) and the network devices 102 may be configured to operate in half-duplex mode (e.g., full-duplex mode is disabled), as described above in reference to FIG. 4A. That is, the UE 104A may be configured to simultaneously receive downlink transmissions 520 from the network device 102A and transmit uplink transmissions 510C to the network device 102B. As shown in FIG. 5, the UE 104A may receive, in combination with the downlink transmissions 520, self-interference 540B from the uplink (transmit) beam transmitting the uplink transmissions 510C and/or interference from other wireless devices, such as cross-link interference 530D from the UE 104B. That is, under certain channel conditions, the UE 104A may receive, as interference, other transmissions from other wireless devices. Alternatively or additionally, the network device 102B may receive, in combination with the uplink transmissions 510C, the cross-link interference 530A from the network device 102A and/or the cross-link interference 530C from the UE 104B.

In other aspects, the network device 102A may be configured to operate in full-duplex mode (e.g., full-duplex mode is enabled) and the UEs 104 may be configured to operate in half-duplex mode (e.g., full-duplex mode is disabled), as described above in reference to FIG. 4B. That is, the network device 102A may be configured to simultaneously receive the uplink transmissions 510B from the UE 104B and transmit the downlink transmissions 520 to the UE 104A. As shown in FIG. 5, the network device 102A may receive, in combination with the uplink transmissions 510B, the self-interference 540A and/or interference from other wireless devices, such as the cross-link interference 530A from the network device 102B. Alternatively or additionally, the UE 104A may receive, in combination with the downlink transmissions 520, the cross-link interference 530B from the network device 102B and/or the cross-link interference 530D from the UE 104B.

In other aspects, the network device 102A may be configured to operate in full-duplex mode (e.g., full-duplex mode is enabled) and the UE 104A may be configured to operate in full-duplex mode (e.g., full-duplex mode is enabled), as described above in reference to FIG. 4C. That is, the network device 102A may be configured to simultaneously receive the uplink transmissions 510A from the UE 104A and transmit the downlink transmissions 520 to the UE 104A. As shown in FIG. 5, the network device 102A may receive, in combination with the uplink transmissions 510A, the self-interference 540A and/or interference from other wireless devices, such as the cross-link interference 530A from the network device 102B and/or the cross-link interference 530E from the UE 104B. Alternatively or additionally, the UE 104A may receive, in combination with the downlink transmissions 520, the self-interference 540B and/or interference from other wireless devices, such the cross-link interference 530B from the network device 102B and/or the cross-link interference 530D from the UE 104B.

It may be understood that the full-duplex wireless communication system 500 depicted in FIG. 5 is only an example of a wireless communication systems that may be utilized without departing from the scope described herein. For example, other network topologies comprising different amounts and/or configurations of network devices 102 and/or UEs 104 may be utilized.

Wireless communication systems (e.g., wireless communication system 100 of FIG. 1, wireless communication systems 400 of FIGS. 4A-4C, full-duplex wireless communication system 500 of FIG. 5) may perform downlink and/or uplink transmissions that may comprise dynamic traffic and/or semi-static traffic. Dynamic traffic may generally refer to dynamically-scheduled communications that may generally be aperiodic and/or scheduled on an as-needed basis. Semi-static traffic may generally refer to regularly occurring (e.g., periodic) communications using a pattern that may continue until modified or released.

Figure 6A:
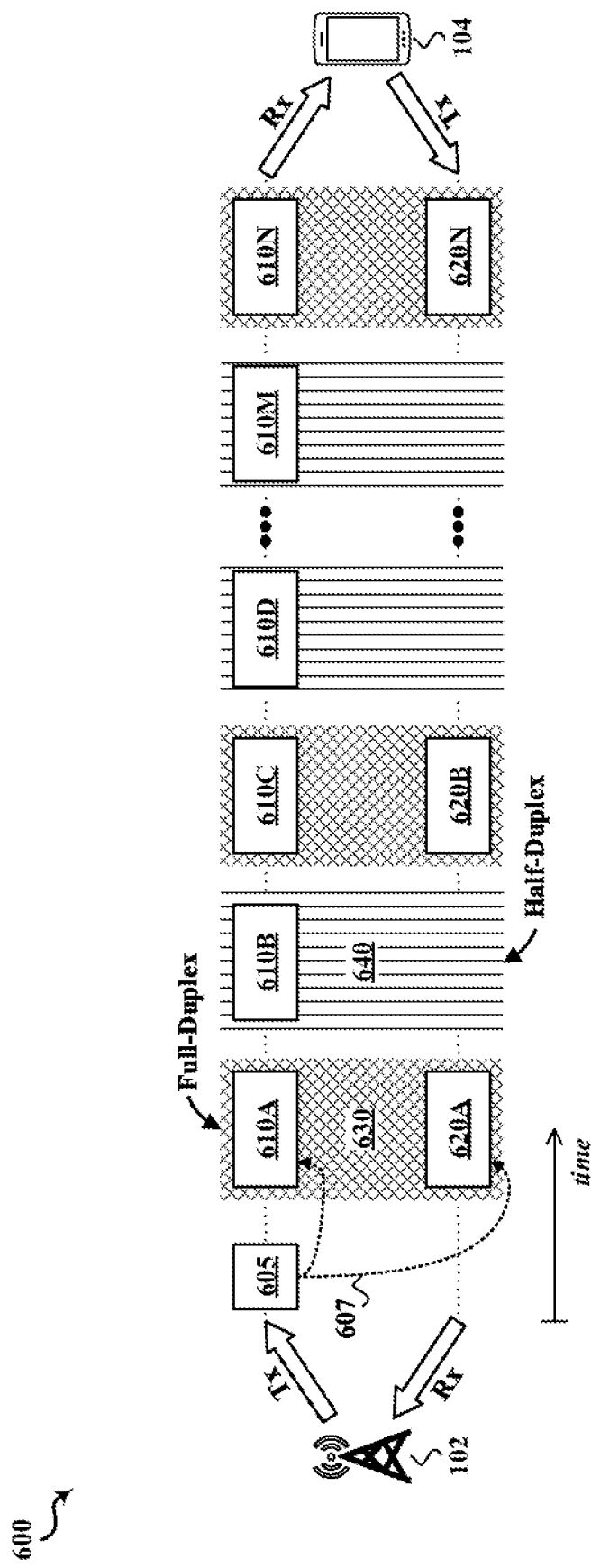
FIG. 6A is a diagram illustrating a first example of semi-static full-duplex scheduling, in accordance with various aspects of the present disclosure.
Figure 6B:
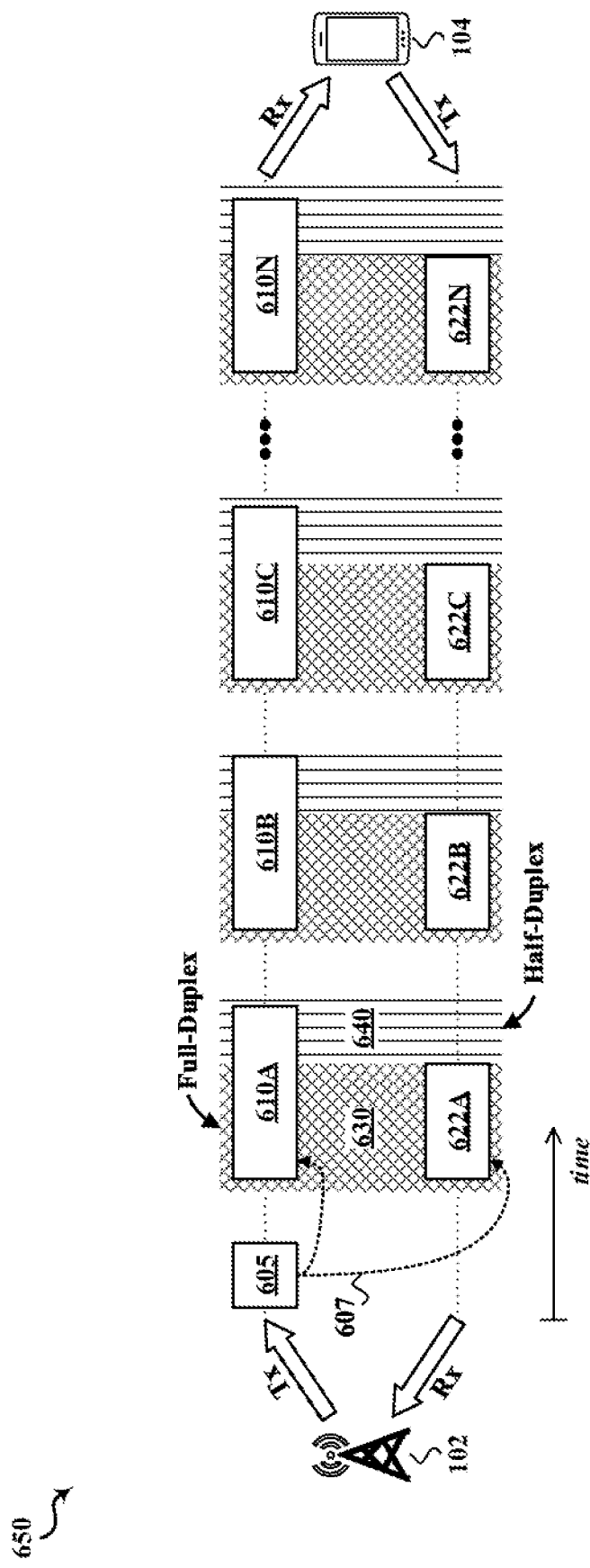
FIG. 6B is a diagram illustrating a second example of semi-static full-duplex scheduling, in accordance with various aspects of the present disclosure.
Figure 6C:
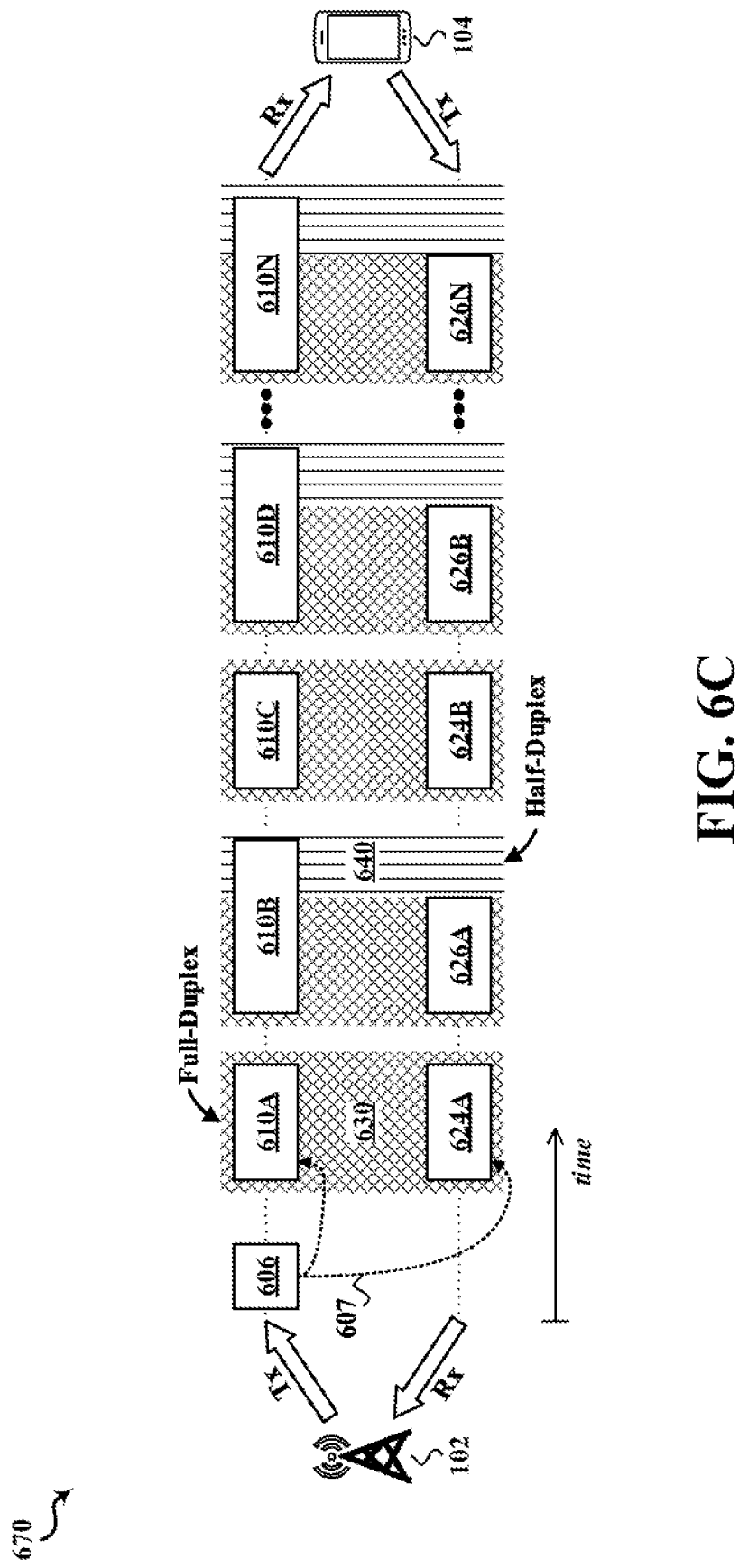
FIG. 6C is a diagram illustrating a third example of semi-static full-duplex scheduling, in accordance with various aspects of the present disclosure.

Referring to FIGS. 6A-6C, the diagrams 600, 650, 670 illustrate examples of different semi-static full-duplex scheduling that may be used for communications between network elements (e.g., base station 102, UE 104). The scheduling examples depicted in FIGS. 6A-6C may be implemented by a full-duplex wireless communication system, such as the wireless communication system and the access network 100 of FIG. 1, the wireless communication systems 400 of FIGS. 4A-4C, and/or the full-duplex wireless communication system of FIG. 5.

For example, the full-duplex wireless communication system may comprise a UE 104 configured to perform full-duplex communications with a first network device 102A and a second network device 102B, as shown in FIG. 4A. Alternatively or additionally, the full-duplex wireless communication may comprise a UE 104 configured to perform full-duplex communications with a network device 102, as shown in FIG. 4C.

FIG. 6A illustrates a first example of semi-static full-duplex scheduling 600. For example, a network device (e.g., base station 102, gNB 180, TRP 102/180 as shown in FIG. 1) may be configured to transmit configuration information 605, such as downlink control information (DCI), to a UE (e.g., UE 104 of FIG. 1). In some aspects, the configuration information 605 may schedule one or more receive occasions 610A-610N (hereinafter "610") for the UE 104 that may comprise semi-persistent scheduling (SPS) occasions. Alternatively or additionally, the configuration information 605 may schedule one or more transmit occasions 620A-620N (hereinafter "620") for the UE 104 that may comprise configured grant (CG) occasions. In other aspects, the configuration information 605 may schedule one or more receive occasions 610 and/or one or more transmit occasions 620 for one or more UEs 104. In such aspects, the configuration information 605 may schedule same receive occasions 610 and/or same transmit occasions 620 for the one or more UEs 104. Alternatively or additionally, the configuration information 605 may schedule same distinct occasions 610 and/or distinct transmit occasions 620 for each UE 104 of the one or more UEs 104.

In other aspects, the configuration information 605 may trigger activation 607 of the one or more receive occasions 610 for the UE 104 and/or of the one or more transmit occasions 620 for the UE 104. Alternatively or additionally, the network device 102 may transmit an additional message that may trigger activation 607 of the one or more receive occasions 610 and/or of the one or more transmit occasions 620. That is, the UE 104 may, in response to the activation 607, activate the one or more receive occasions 610 and of the one or more transmit occasions 620.

As shown in FIG. 6A, a periodicity of the one or more receive occasions 610 may differ from the periodicity of the one or more transmit occasions 620. That is, a periodic interval of the one or more receive occasions 610 may be different from a periodic interval of the one or more transmit occasions 620. Additionally or alternatively, a duration of the one or more receive occasions 610 may match a duration of the one or more transmit occasions 620. As such, a subset of the occasions may comprise full-duplex communications in which a receive occasion overlaps a transmit occasion, such as the occasion 630 corresponding to receive occasion 610A and transmit occasion 620A, for example. That is, the UE 104 may simultaneously receive signals corresponding to the receive occasion 610A and may transmit signals corresponding to the transmit occasion 620A during a same time period corresponding to the receive occasion 610A and to the transmit occasion 620A (e.g., occasion 630). Alternatively or additionally, a remaining subset of the occasions may comprise half-duplex communications in which a receive occasion and a transmit occasion may not overlap, such as the occasion 640 corresponding to receive occasion 610B, for example. That is, the UE 104 may only receive signals corresponding to the receive occasion 610B during the time period corresponding to the receive occasion 610B (e.g., occasion 640).

Referring to FIG. 6B, a duration of the receive occasions 610 may differ from another duration of the transmit occasions 622A-622N (hereinafter, "622"). As such, a full-duplex portion 630 of an overlapping occasion may comprise a portion of a receive occasion 610 overlapping with a portion of a transmit occasion 622, such as a first portion of the occasion corresponding to receive occasion 610A and to the transmit occasion 622A, for example. Alternatively or additionally, a half-duplex portion 640 of the overlapping occasion may comprise a remaining portion of the receive occasion 610 or a remaining portion of the transmit occasion 622, such as a second portion of the occasion corresponding to the remaining portion of receive occasion 610A, for example.

Referring to FIG. 6C, in some aspects, the configuration information 606 may comprise multiple occasion configurations per transmission direction (e.g., downlink/receive, uplink/transmit) for each UE 104. That is, the configuration information 606 may schedule, for the UE 104, one or more sets of receive occasions and/or one or more sets of transmit occasions. For example, the configuration information 606 may schedule one set of receive occasions 610 and two sets of transmit occasions (e.g., 624A-624N, 626A-626N), as shown in FIG. 6C. In some aspects, a set of occasions may have a different configuration from the remaining sets. That is, the one or more sets of occasions may have different periodicities and/or durations, as shown in FIGS. 6A and 6B, for example.

It may be understood that the scheduling examples depicted in FIGS. 6A-6C are only three examples of different semi-static full-duplex scheduling that may be used for communications without departing from the scope described herein. For example, other semi-static full-duplex scheduling configurations comprising different quantities of occasions, different periodicities, and/or different durations may be utilized.

In some aspects, the network device 102 may dynamically transmit the configuration information 605, 606. For example, the network device 102 may transmit the configuration information 605, 606 using DCI messaging. Alternatively or additionally, the network device 102 may transmit the configuration information 605, 606 in a semi-static and/or a static manner. For example, the network device 102 may transmit the configuration information 605, 606 using radio resource control (RRC) signaling.

In other aspects, the configuration information 605, 606 may indicate one or more distinct configurations for performing full-duplex communications. Alternatively or additionally, the configuration information 605, 606 may indicate other distinct configurations for performing half-duplex communications. That is, the configuration information 605, 606 may indicate overlapping full-duplex associated parameters that are to be applied to at least a portion of overlapping full-duplex occasions and/or non-overlapping half-duplex associated parameters that are to be applied to at least a portion of non-overlapping half-duplex occasions. In some aspects, the overlapping full-duplex associated parameters may be different from the non-overlapping half-duplex associated parameters. For example, the overlapping full-duplex associated parameters may be optimized for full-duplex communications and/or the non-overlapping half-duplex associated parameters may be optimized for half-duplex communications.

The overlapping full-duplex associated parameters and the non-overlapping half-duplex associated parameters may comprise at least one of a different beam, a different modulation and coding scheme (MCS), a different transmit power level, a different precoder, a different rank indicator, or a different transmission configuration indication (TCI) state. For example, the overlapping full-duplex associated parameters may indicate a beam pair (e.g., transmit, receive) for performing the full-duplex communications that may have been selected according to a beam separation and/or other signal quality indication (e.g., signal-to-interference ratio (SINR)). In another example, the non-overlapping half-duplex associated parameters may indicate another beam for performing the half-duplex communications that may have been selected according to one or more signal quality indications (e.g., signal-to-noise ratio (SNR), reference signal received power (RSRP)).

As discussed above in reference to FIG. 6B, an overlapping occasion may comprise a receive occasion (e.g., receive occasion 610A) with a duration that may differ from another duration of a transmit occasion (e.g., transmit occasion 620A) comprised by the overlapping occasion. That is, the overlapping occasion may comprise a full-duplex portion (e.g., 630) and a half-duplex portion (e.g., 640). The full-duplex portion of the overlapping occasion may comprise a portion of the receive occasion overlapping with a portion of the transmit occasion. The half-duplex portion of the overlapping occasion may comprise a remaining portion of the receive occasion or a remaining portion of the transmit occasion. As a result, the UE 104 may need to switch, during the overlapping occasion, from a full-duplex configuration to a half-duplex configuration. That is, the UE 104 may switch from performing full-duplex communications during the full-duplex portion of the overlapping occasion using overlapping full-duplex associated parameters to performing half-duplex communications during the half-duplex portion of the overlapping occasion using non-overlapping half-duplex associated parameters. In other aspects, the UE 104 may need to switch, during another overlapping session, from a half-duplex configuration to a full-duplex configuration.

In some aspects, the parameter switch may be implicitly indicated according to a predefined rule. For example, the predefined rule may indicate to select the overlapping full-duplex associated parameters for occasions and/or portions of occasions comprising full-duplex communications. Alternatively or additionally, the predefined rule may indicate to select the non-overlapping half-duplex associated parameters for occasions and/or portions of occasions comprising half-duplex communications. In other aspects, the predefined rule may indicate a default configuration if or when the configuration information 605, 606 does not schedule full-duplex and/or half-duplex semi-static occasions. In other aspects, the predefined rule may be in accordance with one or more regulations and/or standards (e.g., 3GPP standards). The use of the implicit indication for configuring the parameter switch may be preferable if or when the network device 102 is configuring one or more UEs 104 using a same set of configurations. As such, signaling overhead may be potentially reduced.

In other optional or additional aspects, the parameter switch may be explicitly indicated by the configuration information 605, 606. That is, the configuration information 605, 606 may comprise one or more distinct full-duplex configurations corresponding to the one or more UEs 104 and one or more distinct half-duplex configurations corresponding to the one or more UEs 104. For example, the configuration information 605, 606 may indicate a first full-duplex configuration corresponding to a first UE 104 and indicate a second full-duplex configuration corresponding to a second UE 104, wherein the second full-duplex configuration is different from the first full-duplex configuration. Alternatively or additionally, the configuration information 605, 606 may indicate a first half-duplex configuration corresponding to the first UE 104 and indicate a second half-duplex configuration corresponding to the second UE 104, wherein the second half-duplex configuration is different from the first half-duplex configuration. Such aspects may be preferable if or when the network device 102 is configuring one or more UEs 104 using different sets of configurations. For example, a network device 102 may configure and/or activate a first UE 104 with a set of receive occasions (e.g., receive occasions 610) that may at least partially overlap in time with a set of transmit occasions (e.g., transmit occasions 620) that the network device 102 configured and/or activated for a second UE 104.

In other optional or additional aspects, the configuration information 605, 606 may comprise one or more distinct full-duplex configurations corresponding to one or more occasions and one or more distinct half-duplex configurations corresponding to one or more occasions. For example, the configuration information 605, 606 may indicate a first full-duplex configuration corresponding to a first occasion and indicate a second full-duplex configuration corresponding to a second occasion, wherein the second full-duplex configuration is different from the first full-duplex configuration. Alternatively or additionally, the configuration information 605, 606 may indicate a first half-duplex configuration corresponding to the first occasion and indicate a second half-duplex configuration corresponding to the second occasion, wherein the second half-duplex configuration is different from the first half-duplex configuration.

In other optional or additional aspects, the configuration information 605, 606 may indicate one or more first time durations corresponding to the full-duplex configuration. Alternatively or additionally, the configuration information 605, 606 may indicate one or more second time durations corresponding to the half-duplex configuration.

In other optional or additional aspects, the configuration information 605, 606 may comprise a first indication of one or more full-duplex associated parameters for the full-duplex portion of the overlapping occasion and a second indication of one or more half-duplex associated parameters for the half-duplex portion of the overlapping occasion. In such aspects, the UE 104 may select the overlapping full-duplex associated parameters from the one or more full-duplex associated parameters. Alternatively or additionally, the UE 104 may select the non-overlapping half-duplex associated parameters from the one or more half-duplex associated parameters.

In other optional or additional aspects, the configuration information 605, 606 may comprise a group common DCI indicating the overlapping full-duplex associated parameters and the non-overlapping half-duplex associated parameters. In some aspects, the one or more receive occasions and the one or more transmit occasions may correspond to different UEs 104. For example, the group common DCI may schedule and/or activate a set of receive occasions (e.g., receive occasions 610) for a first half-duplex UE 104 and and/or a set of transmit occasions (e.g., transmit occasions 620) for a second half-duplex UE 104. In some aspects, one or more receive occasions of the set of receive occasions may at least partially overlap at least one transmit occasion of the set of transmit occasions. As such, the first half-duplex UE 104 may select the overlapping full-duplex associated parameters for the overlapping portions of the receive occasions and/or may select the non-overlapping half-duplex associated parameters for the remaining portions of the receive occasions. Alternatively or additionally, the second half-duplex UE 104 may select the overlapping full-duplex associated parameters for the overlapping portions of the transmit occasions and/or may select the non-overlapping half-duplex associated parameters for the remaining portions of the transmit occasions. Thus, such aspects may be preferable if or when the network device 102 is performing full-duplex communications with a first half-duplex UE 104 and a second half-duplex UE 104, as shown in FIG. 4B.

Figure 7:
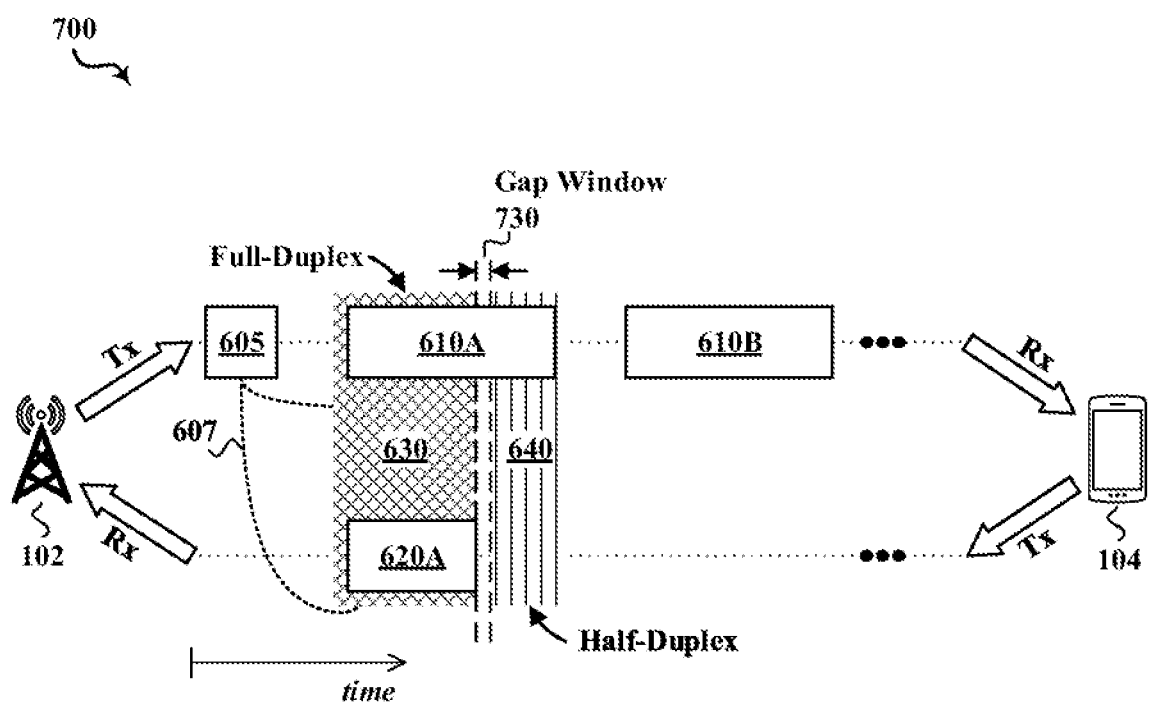
FIG. 7 is a diagram illustrating an example of semi-static full-duplex scheduling with a gap window, in accordance with various aspects of the present disclosure.

FIG. 7 illustrating a semi-static full-duplex scheduling example 700 with a gap window 730. The semi-static full-duplex scheduling example 700 may be similar in many respects to the semi-static full-duplex scheduling 600 of FIG. 6A and may include additional features not mentioned above. For example, the semi-static full-duplex scheduling example 700 depicts a gap window 730.

In some aspects, the gap window 730 may be assigned between a full-duplex portion of an overlapping occasion and a half-duplex portion of the overlapping occasion. The gap window 730 may provide the UE 104 with time to effect the parameter switch between the overlapping full-duplex associated parameters and the non-overlapping half-duplex associated parameters. For example, the UE 104 may, during the gap window 730, switch from one TCI state to another, change configuration of one or more amplifiers (e.g., power amplifiers, low-noise amplifiers), change beam configuration, and the like. In some aspects, the gap window 730 may be omitted (e.g., may be set to a duration equivalent to zero symbols). For example, if or when a sub-carrier spacing (SCS) of the wireless communication system is below a certain SCS threshold (e.g., 480 kHz), the gap window 730 may be omitted. In other aspects, the gap window duration of the gap window 730 may be set to N symbols, wherein N is an integer greater than or equal to one (e.g., 1, 2). For example, the gap window duration may be set to 1 or 2 symbols, if or when the operating frequency band of the wireless communication system is above a certain frequency band threshold (e.g., FR2 (24.25 GHz-52.6 GHz)).

In other aspects, the gap window 730 may be implicitly indicated according to a predefined rule. For example, the predefined rule may indicate whether or not to assign a gap window 730 and/or a gap window duration for the gap window 730. The predefined rule may indicate one gap window duration and/or may indicate one or more gap window duration values according to one or more configuration parameters of the wireless communication system (e.g., SCS, frequency operating band).

Alternatively or additionally, the predefined rule may define one or more actions that may be performed by the network device 102 and/or the UE 104 during the gap window 730. For example, the predefined rule may define one or more actions comprising at least one of: preventing transmissions during the gap window 730, transmitting data during the gap window 730, preventing reception of data during the gap window 730, and/or receiving data during the gap window 730.

In other aspects, the gap window 730 may be implicitly indicated by the configuration information 605, 606. For example, the configuration information 605, 606 may indicate one or more gap resources and/or parameters to be used during the gap window 730.

In some aspects, the configuration information 605, 606 may indicate one or more resources and/or parameters for transmitting an acknowledgement (ACK) and/or a negative acknowledgement (NACK) in response to receiving a particular signal (e.g., receive occasions 610). That is, the configuration information 605, 606 may indicate one or more half-duplex acknowledgement resources from transmitting the ACK/NACK and/or one or more full-duplex acknowledgement resources from transmitting the ACK/NACK.

Figure 8A:
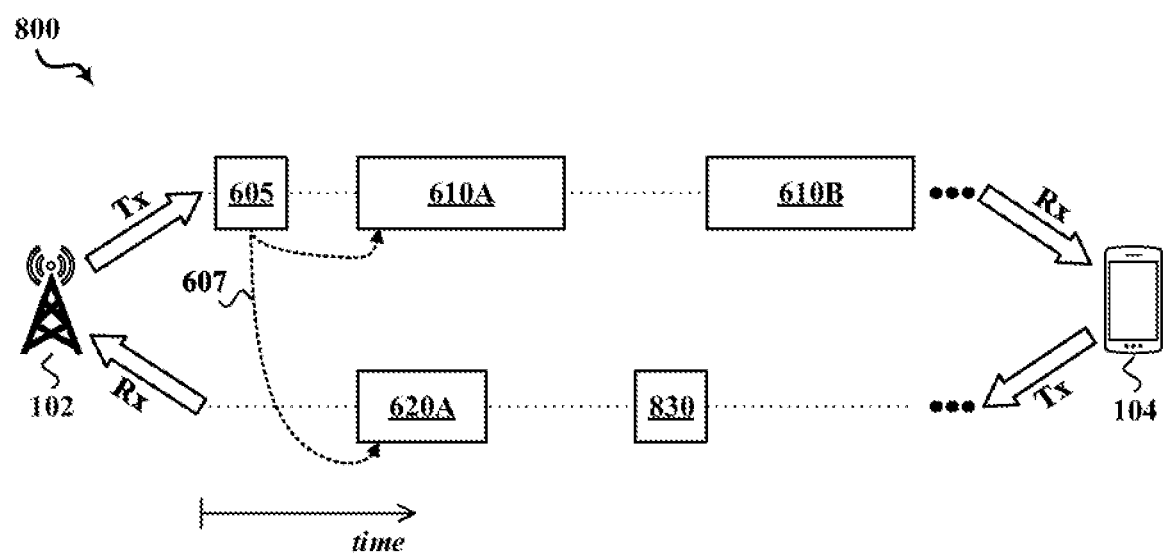
FIG. 8A is a diagram illustrating a first example of acknowledgment timing in the semi-static full-duplex scheduling, in accordance with various aspects of the present disclosure.
Figure 8B:
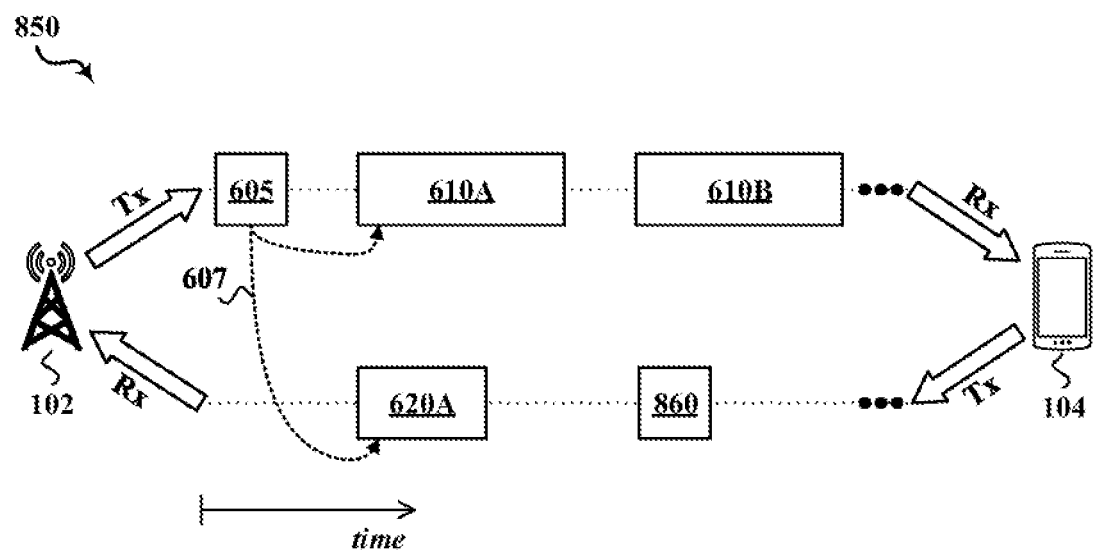
FIG. 8B is a diagram illustrating a second example of acknowledgment timing in the semi-static full-duplex scheduling, in accordance with various aspects of the present disclosure.

Referring to FIGS. 8A and 8B, the diagrams 800 and 850, respectively, illustrate two examples of different semi-static full-duplex scheduling that may be used for transmitting a ACK/NACK. The semi-static full-duplex scheduling examples 800, 850 may be similar in many respects to the semi-static full-duplex scheduling 600 of FIG. 6A and may include additional features not mentioned above. For example, the semi-static full-duplex scheduling examples 800, 850 depict a ACK/NACK 830, 860.

For example, the configuration information 605, 606 may indicate to transmit the ACK/NACK 830 between two occasions (e.g., receive occasions 610A and 610B), as shown in FIG. 8A. That is, the configuration information 605, 606 may configure the UE 104 to transmit the ACK/NACK 830 using the half-duplex acknowledgement resources.

For another example, the configuration information 605, 606 may indicate to transmit the ACK/NACK 860 overlapped with another occasion, as shown in FIG. 8B. For example, the configuration information 605, 606 may indicate to transmit the ACK/NACK 860 corresponding to the receive occasion 610A during the receive occasion 610B. That is, the configuration information 605, 606 may configure the UE 104 to transmit the ACK/NACK 860 using the full-duplex acknowledgement resources.

Figure 9:
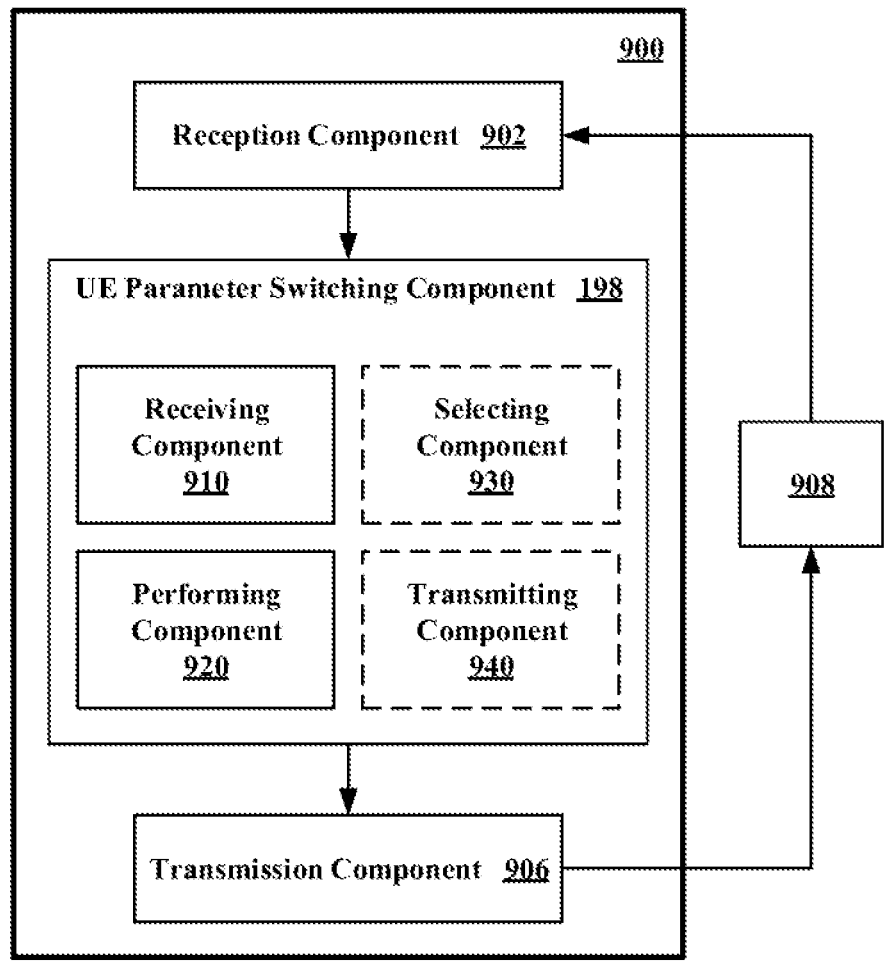
FIG. 9 is a diagram illustrating an example apparatus, such as a user equipment (UE), for wireless communication in a wireless communication network, in accordance with various aspects of the present disclosure.

FIG. 9 is a block diagram of an example apparatus 900 for wireless communication by a UE of a wireless communication network. The apparatus 900 may be a UE 104 (e.g., UE 104 of FIGS. 1 and 3-8) or a UE 104 may include the apparatus 900. In some aspects, the apparatus 900 may include a reception component 902 configured to receive wireless communications from another apparatus (such as apparatus 908), a UE parameter switching component 198 configured to perform semi-static full-duplex communications, and a transmission component 906 to transmit wireless communications to another apparatus (e.g., apparatus 908). The components of apparatus 900 may be in communication with one another (e.g., via buses or electrical connections). As shown, the apparatus 900 may be in communication with another apparatus 908 (such as a base station 102, or another wireless communication device) using the reception component 902 and the transmission component 906.

In some aspects, the apparatus 900 may be configured to perform one or more operations described herein in connection with FIGS. 1 and 3-8. Alternatively or additionally, the apparatus 900 may be configured to perform one or more processes described herein, such as method 1000 of FIGS. 10-11. In some aspects, the apparatus 900 may include one or more components of the UE 104 described above in connection with FIGS. 1 and 3-8.

The reception component 902 may receive communications, such as reference signals, control information, data communications, or a combination thereof, from the apparatus 908. The reception component 902 may provide received communications to one or more other components of the apparatus 900, such as the UE parameter switching component 198. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE 104 described above in connection with FIGS. 1 and 3-8.

The transmission component 906 may transmit communications, such as reference signals, control information, data communications, or a combination thereof, to the apparatus 908. In some aspects, the UE parameter switching component 198 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In other aspects, the transmission component 906 may include one or more antennas, a modulator, a transmit MIMO processor, a transmit processor, a controller/processor, a memory, or a combination thereof, of the UE 104 described above in connection with FIGS. 1 and 3-8. In some aspects, the transmission component 906 may be co-located with the reception component 902 in a transceiver or transceiver component.

The UE parameter switching component 198 may be configured to perform semi-static full-duplex communications. In some aspects, the UE parameter switching component 198 may include a set of components, such as a receiving component 910 and a performing component 920. The receiving component 910 may be configured to receive, from an apparatus 908, configuration information scheduling one or more receive occasions for the UE and one or more transmit occasions for the UE. The performing component 920 may be configured to perform full-duplex communications and to perform half-duplex communications.

In other optional or additional aspects, the UE parameter switching component 198 may include a selecting component 930 and a transmitting component 940. The selecting component 930 may be configured to select the overlapping full-duplex associated parameters and the non-overlapping half-duplex associated parameters. The transmitting component 940 may be configured to transmit an acknowledgement corresponding to a receive occasion.

Alternatively or additionally, the set of components may be separate and distinct from the UE parameter switching component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1 and 3-8. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIGS. 1 and 3-8.

Figure 10:
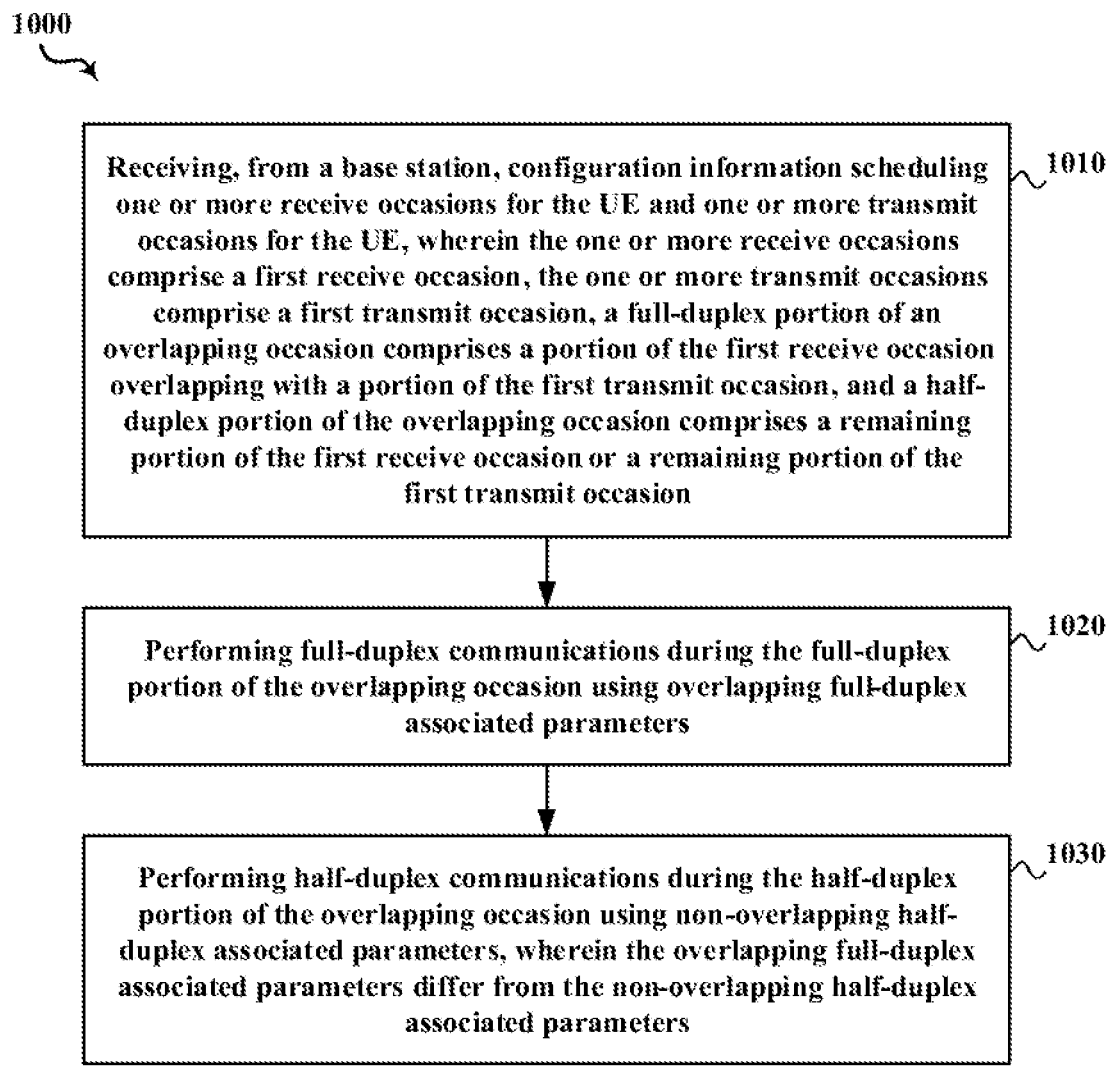
FIG. 10 is a flowchart of a method of wireless communication by a UE of a wireless communication network, in accordance with various aspects of the present disclosure.
Figure 11:
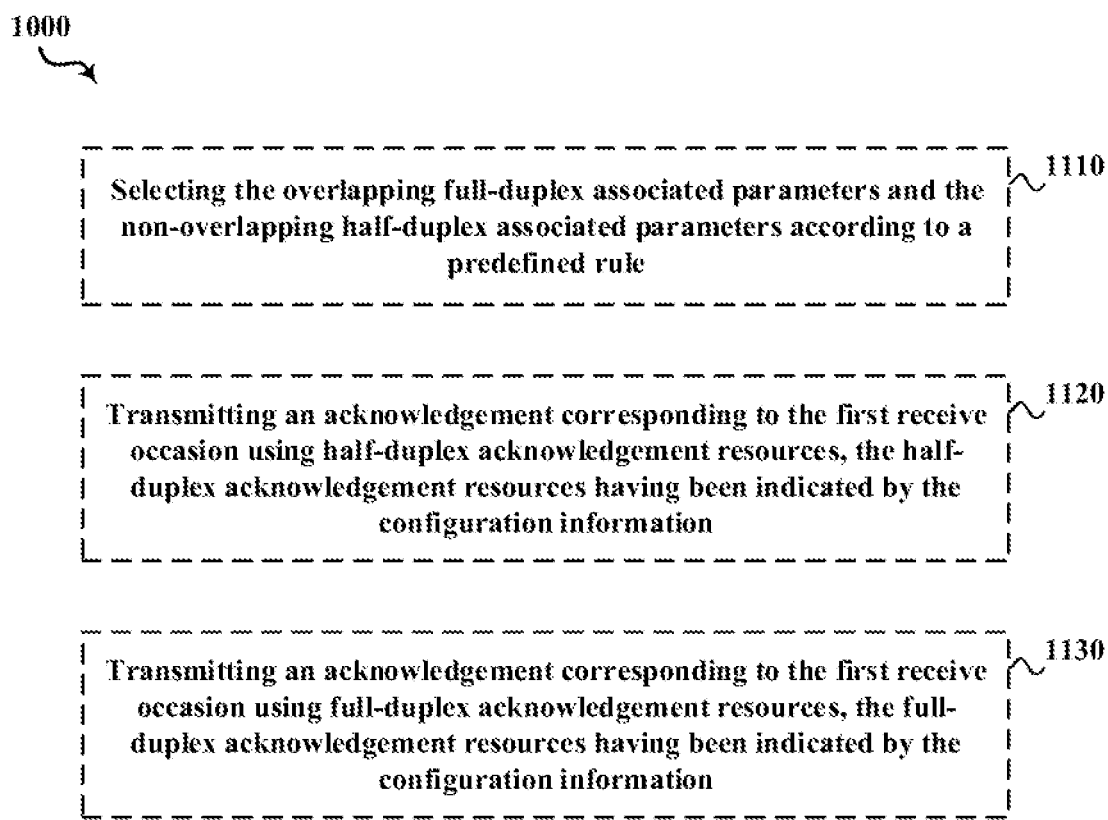
FIG. 11 is a flowchart of additional or optional steps for the method of wireless communication by a UE of a wireless communication network, in accordance with various aspects of the present disclosure.

Referring to FIGS. 9-11, in operation, an apparatus 900 may perform a method 1000 of wireless communication at a UE 104. Alternatively or additionally, the method 1000 may be performed by the UE 104 (which may include the memory 357 and which may be the entire UE 104 and/or one or more components of the UE 104 such as the UE parameter switching component 198, the TX processor 356, the RX processor 353, and/or the controller/processor 355). The method 1000 may be performed by the UE parameter switching component 198 in communication with the apparatus 908 (e.g., base station 102).

At block 1010 of FIG. 10, the method 1000 includes receiving, from a base station, configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion. For example, in an aspect, the UE 104, the RX processor 353, the controller/processor 355, the UE parameter switching component 198, and/or the receiving component 910 may be configured to or may comprise means for receiving, from a base station 102, configuration information 605, 606 scheduling one or more receive occasions 610 for the UE 104 and one or more transmit occasions 620 for the UE 104, wherein the one or more receive occasions 610 comprise a first receive occasion 610A, the one or more transmit occasions 620 comprise a first transmit occasion 620A, a full-duplex portion of an overlapping occasion comprises a portion of the first receive occasion 610A overlapping with a portion of the first transmit occasion 620A, and a half-duplex portion of the overlapping occasion comprises a remaining portion of the first receive occasion 610A or a remaining portion of the first transmit occasion 620A.

For example, the receiving at block 1010 may include receiving, from the base station 102, the configuration information 605, 606 scheduling the one or more receive occasions 610 and the one or more transmit occasions 620, as described above in reference to FIGS. 6-8.

In some aspects, the receiving at block 1010 may include receiving a first indication of one or more full-duplex associated parameters for the full-duplex portion of the overlapping occasion and a second indication of one or more half-duplex associated parameters for the half-duplex portion of the overlapping occasion, as described above in reference to FIGS. 6A-6C.

In other optional or additional aspects, the receiving at block 1010 may include selecting the overlapping full-duplex associated parameters from the one or more full-duplex associated parameters.

In other optional or additional aspects, the receiving at block 1010 may include selecting the non-overlapping half-duplex associated parameters from the one or more half-duplex associated parameters.

In other optional or additional aspects, the receiving at block 1010 may include receiving group common downlink configuration information (DCI) indicating the overlapping full-duplex associated parameters and the non-overlapping half-duplex associated parameters. The one or more receive occasions and the one or more transmit occasions may be for a plurality of different UEs comprising the UE 104, as described above in reference to FIGS. 6A-6C.

In other optional or additional aspects, the receiving at block 1010 may include receiving scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion, as described above in reference to FIGS. 6A-6C.

In other optional or additional aspects, the receiving at block 1010 may include receiving scheduling information that schedules a gap window 730 between the full-duplex portion 630 of the overlapping occasion and the half-duplex portion 640 of the overlapping occasion, as described above in reference to FIG. 7. The gap window may have a gap window duration of N symbols, wherein N is an integer greater than or equal to one.

For example, the receiving at block 1010 may include receiving a value corresponding to the gap window duration. In other optional or additional aspects, the receiving at block 1010 may include selecting the gap window duration according to a predefined rule. In other optional or additional aspects, the receiving at block 1010 may include selecting the gap window duration according to an indication comprised by the configuration information 605, 606.

In other optional or additional aspects, the receiving at block 1010 may include preventing transmissions during the gap window 730, as described above in reference to FIG. 7.

In other optional or additional aspects, the receiving at block 1010 may include transmitting data during the gap window 730, as described above in reference to FIG. 7.

In other optional or additional aspects, the receiving at block 1010 may include preventing reception of data during the gap window 730, as described above in reference to FIG. 7.

In other optional or additional aspects, the receiving at block 1010 may include receiving data during the gap window 730, as described above in reference to FIG. 7.

Further, for example, the receiving at block 1010 may be performed to configure the one or more receive occasions and the one or more transmit occasions for performing full-duplex communications and/or half-duplex communications. Thus, aspects presented herein may potentially reduce latency, increase spectrum efficiency, and increase resource utilization by allowing for reception and/or transmission of signals during a same scheduled occasion.

At block 1020 of FIG. 10, the method 1000 includes performing full-duplex communications during the full-duplex portion of the overlapping occasion using overlapping full-duplex associated parameters. For example, in an aspect, the UE 104, the TX processor 356, the RX processor 353, the controller/processor 355, the UE parameter switching component 198, and/or the performing component 920 may be configured to or may comprise means for performing full-duplex communications during the full-duplex portion of the overlapping occasion using overlapping full-duplex associated parameters.

For example, the performing at block 1020 may include performing full-duplex communications during the full-duplex portion of the overlapping occasion using overlapping full-duplex associated parameters, as described above in reference to FIGS. 6A-6C.

In some aspects, the overlapping full-duplex associated parameters may comprise at least one of a different beam, a different modulation and coding scheme (MCS), a different transmit power level, a different precoder, a different rank indicator, or a different TCI state.

Further, for example, the performing at block 1020 may be performed to effect the full-duplex communications as scheduled and/or configured by the configuration information 605, 606.

At block 1030 of FIG. 10, the method 1000 includes performing half-duplex communications during the half-duplex portion of the overlapping occasion using non-overlapping half-duplex associated parameters, wherein the overlapping full-duplex associated parameters differ from the non-overlapping half-duplex associated parameters. For example, in an aspect, the UE 104, the TX processor 356, the RX processor 353, the controller/processor 355, the UE parameter switching component 198, and/or the performing component 920 may be configured to or may comprise means for performing half-duplex communications during the half-duplex portion of the overlapping occasion using non-overlapping half-duplex associated parameters, wherein the overlapping full-duplex associated parameters differ from the non-overlapping half-duplex associated parameters.

For example, the performing at block 1030 may include performing half-duplex communications during the half-duplex portion of the overlapping occasion using non-overlapping half-duplex associated parameters, as described above in reference to FIGS. 6A-6C.

In some aspects, the non-overlapping half-duplex associated parameters may comprise at least one of a different beam, a different MCS, a different transmit power level, a different precoder, a different rank indicator, and a different TCI state.

Further, for example, the performing at block 1030 may be performed to effect the half-duplex communications as scheduled and/or configured by the configuration information 605, 606.

Referring to FIG. 11, in an optional or additional aspect that may be combined with any other aspect, at block 1110, the method 1000 of FIG. 10 may include selecting the overlapping full-duplex associated parameters and the non-overlapping half-duplex associated parameters according to a predefined rule. For example, in an aspect, the UE 104, the TX processor 356, the RX processor 353, the controller/processor 355, the UE parameter switching component 198, and/or the selecting component 930 may be configured to or may comprise means for selecting the overlapping full-duplex associated parameters and the non-overlapping half-duplex associated parameters according to a predefined rule.

For example, the selecting at block 1110 may include selecting the overlapping full-duplex associated parameters and the non-overlapping half-duplex associated parameters according to the predefined rule, as described above in reference to FIGS. 6A-6C.

In some aspects, the predefined rule may indicate to select the overlapping full-duplex associated parameters for occasions and/or portions of occasions comprising full-duplex communications. Alternatively or additionally, the predefined rule may indicate to select the non-overlapping half-duplex associated parameters for occasions and/or portions of occasions comprising half-duplex communications. In other optional or additional aspects, the predefined rule may indicate a default configuration if or when the configuration information 605, 606 does not schedule full-duplex and/or half-duplex semi-static occasions. In other optional or additional aspects, the predefined rule may be in accordance with one or more regulations and/or standards (e.g., 3GPP standards).

Further, for example, the selecting at block 1110 may be performed to select the overlapping full-duplex associated parameters and the non-overlapping half-duplex associated parameters according to an implicit indication of the configuration information 605, 606. As such, signaling overhead may be potentially reduced.

In an optional or additional aspect that may be combined with any other aspect, at block 1120, the method 1000 of FIG. 10 may include transmitting an acknowledgement corresponding to the first receive occasion using half-duplex acknowledgement resources, the half-duplex acknowledgement resources having been indicated by the configuration information. For example, in an aspect, the UE 104, the TX processor 356, the RX processor 353, the controller/processor 355, the UE parameter switching component 198, and/or the transmitting component 940 may be configured to or may comprise means for transmitting an acknowledgement 830 corresponding to the first receive occasion 610A using half-duplex acknowledgement resources, the half-duplex acknowledgement resources having been indicated by the configuration information 606, 606.

For example, the transmitting at block 1120 may include transmitting the acknowledgement 830, as described above in reference to FIG. 8A.

Further, for example, the transmitting at block 1120 may be performed to indicate to the network device 102 whether the UE 104 successfully received the first receive occasion 610A.

In an optional or additional aspect that may be combined with any other aspect, at block 1130, the method 1000 of FIG. 10 may include transmitting an acknowledgement corresponding to the first receive occasion using full-duplex acknowledgement resources, the full-duplex acknowledgement resources having been indicated by the configuration information. For example, in an aspect, the UE 104, the TX processor 356, the RX processor 353, the controller/processor 355, the UE parameter switching component 198, and/or the transmitting component 940 may be configured to or may comprise means for transmitting an acknowledgement 860 corresponding to the first receive occasion 610A using full-duplex acknowledgement resources, the full-duplex acknowledgement resources having been indicated by the configuration information 605, 606.

For example, the transmitting at block 1130 may include transmitting the acknowledgement 860, as described above in reference to FIG. 8B.

Further, for example, the transmitting at block 1130 may be performed to indicate to the network device 102 whether the UE 104 successfully received the first receive occasion 610A.

Figure 12:
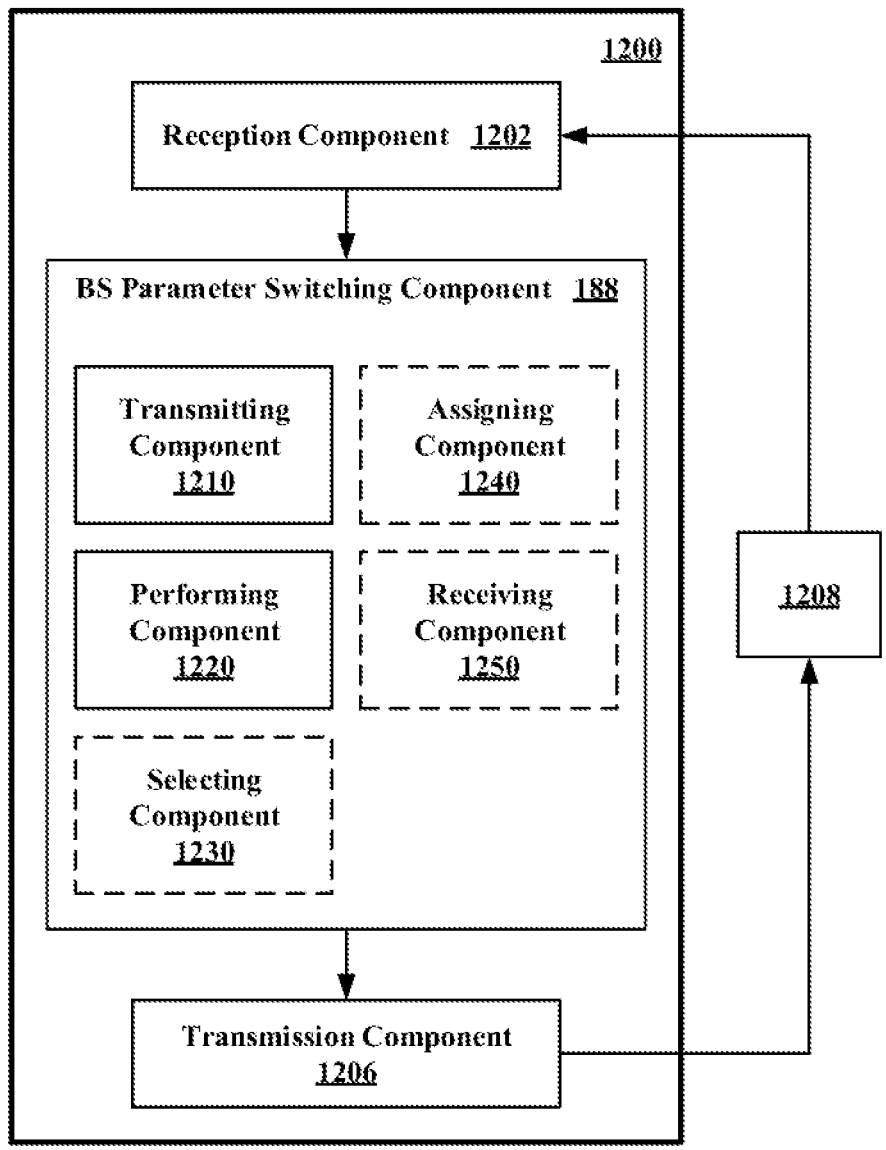
FIG. 12 is a diagram illustrating an example apparatus, such as a network node, for wireless communication in a wireless communication network, in accordance with various aspects of the present disclosure.

FIG. 12 is a block diagram of an example apparatus 1200 for wireless communication by a base station of a wireless communication network. The apparatus 1200 may be a base station 102 (e.g., base station 102 of FIGS. 1 and 3) or a base station 102 may include the apparatus 1200. In some aspects, the apparatus 1200 may include a reception component 1202 configured to receive wireless communications from another apparatus (such as apparatus 1208), a BS parameter switching component 188 configured to schedule and configure semi-static full-duplex communications, a transmission component 1206 configured to transmit wireless communications to another apparatus (e.g., apparatus 1208), and which may be in communication with one another (e.g., via buses or electrical connections). As shown, the apparatus 1200 may be in communication with another apparatus 1208 (such as a UE 104, or another wireless communication device) using the reception component 1202 and the transmission component 1206.

In some aspects, the apparatus 1200 may be configured to perform one or more operations described herein in connection with FIGS. 1 and 3-8. Alternatively or additionally, the apparatus 1200 may be configured to perform one or more processes described herein, such as method 1300 of FIGS. 13-14. In some aspects, the apparatus 1200 may include one or more components of the base station 102 described above in connection with FIGS. 1 and 3-8.

The reception component 1202 may receive communications, such as reference signals, control information, data communications, or a combination thereof, from the apparatus 1208. The reception component 1202 may provide received communications to one or more other components of the apparatus 1200, such as the BS parameter switching component 188. In some aspects, the reception component 1202 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station 102 described above in connection with FIGS. 1 and 3.

The transmission component 1206 may transmit communications, such as reference signals, control information, data communications, or a combination thereof, to the apparatus 1208. In some aspects, the BS parameter switching component 188 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In other aspects, the transmission component 1206 may include one or more antennas, a modulator, a transmit MIMO processor, a transmit processor, a controller/processor, a memory, or a combination thereof, of the base station 102 described above in connection with FIGS. 1 and 6. In some aspects, the transmission component 1206 may be co-located with the reception component 1202 in a transceiver or transceiver component.

The BS parameter switching component 188 may be configured to schedule and configure semi-static full-duplex communications. In some aspects, the BS parameter switching component 188 may include a set of components, such as a transmitting component 1210 and a performing component 1220. The transmitting component 1210 may be configured to transmit configuration information scheduling one or more receive occasions for one or more UEs and one or more transmit occasions for one or more UEs. The performing component 1220 may be configured to perform full-duplex communications and to perform half-duplex communications.

In other optional or additional aspects, the BS parameter switching component 188 may include a selecting component 1230, an assigning component 1240, and a receiving component 1250. The selecting component 1230 may be configured to select the overlapping full-duplex associated parameters and the non-overlapping half-duplex associated parameters according to a predefined rule. The assigning component 1240 may be configured to assign a gap window. The receiving component 1250 may be configured to receive an acknowledgement.

Alternatively or additionally, the set of components may be separate and distinct from the BS parameter switching component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1 and 3. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 and 3-8.

Figure 13:
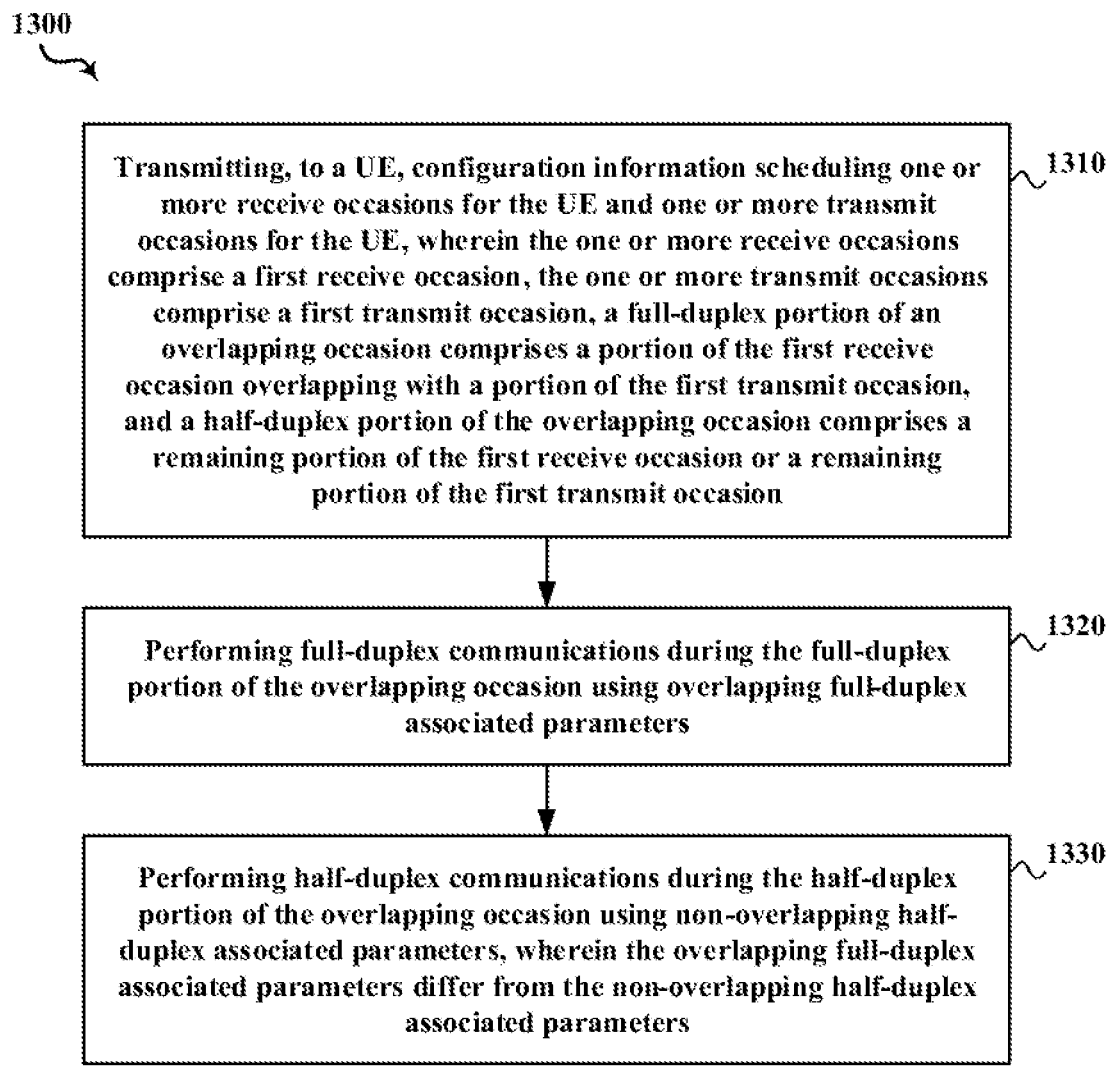
FIG. 13 is a flowchart of a method of wireless communication by a network node of a wireless communication network, in accordance with various aspects of the present disclosure.
Figure 14:
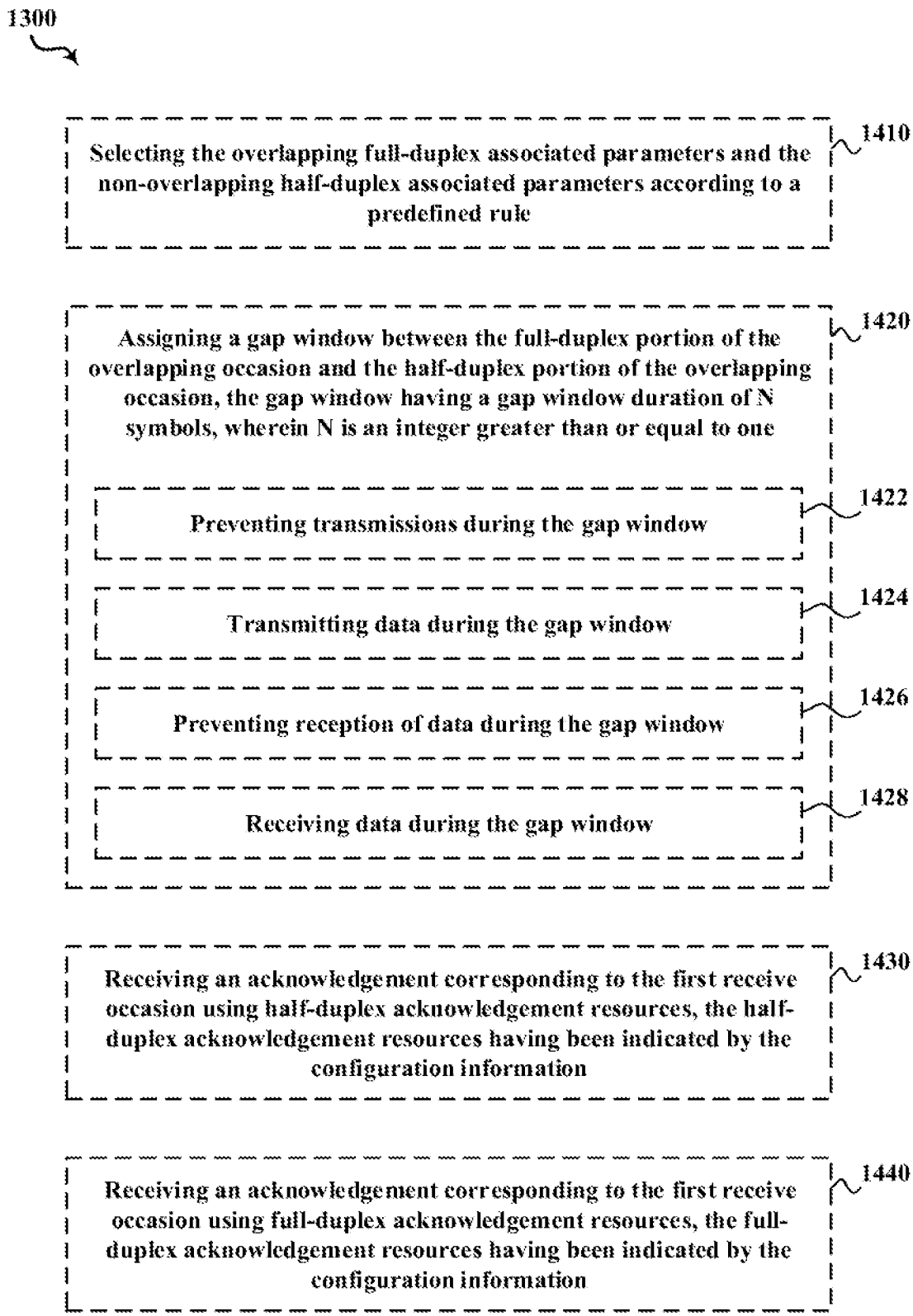
FIG. 14 is a flowchart of additional or optional steps for the method of wireless communication by a base station of a wireless communication network, in accordance with various aspects of the present disclosure.

Referring to FIGS. 12-14, in operation, an apparatus 1200 may perform a method 1300 of wireless communication at a network node. Alternatively or additionally, the method 1300 may be performed by the base station 102 (which may include the memory 317 and which may be the entire base station 102 and/or one or more components of the base station 102 such as the BS parameter switching component 188, the TX processor 316, the RX processor 313, and/or the controller/processor 315). The method 1300 may be performed by the BS parameter switching component 188 in communication with the apparatus 1208 (e.g., UE 104).

At block 1310 of FIG. 13, the method 1300 includes transmitting, to a user equipment (UE), configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion. For example, in an aspect, the base station 102, the TX processor 316, the controller/processor 315, the BS parameter switching component 188, and/or the transmitting component 1210 may be configured to or may comprise means for transmitting, to a UE 104, configuration information 605, 606 scheduling one or more receive occasions 610 for the UE and one or more transmit occasions 620 for the UE, wherein the one or more receive occasions 610 comprise a first receive occasion 610A, the one or more transmit occasions 620 comprise a first transmit occasion 620A, a full-duplex portion of an overlapping occasion comprises a portion of the first receive occasion 610A overlapping with a portion of the first transmit occasion 620A, and a half-duplex portion of the overlapping occasion comprises a remaining portion of the first receive occasion 610A or a remaining portion of the first transmit occasion 620A.

For example, the transmitting at block 1310 may include transmitting, to the UE 104, the configuration information 605, 606 scheduling the one or more receive occasions 610 and the one or more transmit occasions 620, as described above in reference to FIGS. 6-8.

In some aspects, the transmitting at block 1310 may include transmitting a first indication of one or more full-duplex associated parameters for the full-duplex portion of the overlapping occasion and a second indication of one or more half-duplex associated parameters for the half-duplex portion of the overlapping occasion, as described above in reference to FIGS. 6A-6C.

In other optional or additional aspects, the transmitting at block 1310 may include transmitting group common DCI indicating the overlapping full-duplex associated parameters and the non-overlapping half-duplex associated parameters. The one or more receive occasions and the one or more transmit occasions may be for a plurality of different UEs comprising the UE 104, as described above in reference to FIGS. 6A-6C.

In other optional or additional aspects, the transmitting at block 1310 may include transmitting scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion, as described above in reference to FIGS. 6A-6C.

Further, for example, the transmitting at block 1310 may be performed to configure the one or more receive occasions and the one or more transmit occasions for performing full-duplex communications and/or half-duplex communications. Thus, aspects presented herein may potentially reduce latency, increase spectrum efficiency, and increase resource utilization by allowing for reception and/or transmission of signals during a same scheduled occasion.

At block 1320 of FIG. 13, the method 1300 includes performing full-duplex communications during the full-duplex portion of the overlapping occasion using overlapping full-duplex associated parameters. For example, in an aspect, the base station 102, the TX processor 316, the RX processor 313, the controller/processor 315, the BS parameter switching component 188, and/or the performing component 1220 may be configured to or may comprise means for performing full-duplex communications during the full-duplex portion of the overlapping occasion using overlapping full-duplex associated parameters.

For example, the performing at block 1320 may include performing full-duplex communications during the full-duplex portion of the overlapping occasion using overlapping full-duplex associated parameters, as described above in reference to FIGS. 6A-6C.

In some aspects, the overlapping full-duplex associated parameters may comprise at least one of a different beam, a different modulation and coding scheme (MCS), a different transmit power level, a different precoder, a different rank indicator, or a different TCI state.

Further, for example, the performing at block 1320 may be performed to effect the full-duplex communications as scheduled and/or configured by the configuration information 605, 606.

At block 1330 of FIG. 13, the method 1300 includes performing half-duplex communications during the half-duplex portion of the overlapping occasion using non-overlapping half-duplex associated parameters, wherein the overlapping full-duplex associated parameters differ from the non-overlapping half-duplex associated parameters. For example, in an aspect, the base station 102, the TX processor 316, the RX processor 313, the controller/processor 315, the BS parameter switching component 188, and/or the performing component 1220 may be configured to or may comprise means for performing half-duplex communications during the half-duplex portion of the overlapping occasion using non-overlapping half-duplex associated parameters, wherein the overlapping full-duplex associated parameters differ from the non-overlapping half-duplex associated parameters.

For example, the performing at block 1330 may include performing half-duplex communications during the half-duplex portion of the overlapping occasion using non-overlapping half-duplex associated parameters, as described above in reference to FIGS. 6A-6C.

In some aspects, the non-overlapping half-duplex associated parameters may comprise at least one of a different beam, a different MCS, a different transmit power level, a different precoder, a different rank indicator, or a different TCI state.

Further, for example, the performing at block 1330 may be performed to effect the half-duplex communications as scheduled and/or configured by the configuration information 605, 606.

Referring to FIG. 14, in an optional or additional aspect that may be combined with any other aspect, at block 1410, the method 1300 of FIG. 13 may include selecting the overlapping full-duplex associated parameters and the non-overlapping half-duplex associated parameters according to a predefined rule. For example, in an aspect, the base station 102, the BS parameter switching component 188, and/or the selecting component 1230 may be configured to or may comprise means for selecting the overlapping full-duplex associated parameters and the non-overlapping half-duplex associated parameters according to a predefined rule.

For example, the selecting at block 1410 may include selecting the overlapping full-duplex associated parameters and the non-overlapping half-duplex associated parameters according to the predefined rule, as described above in reference to FIGS. 6A-6C.

Further, for example, the selecting at block 1410 may be performed to select the overlapping full-duplex associated parameters and the non-overlapping half-duplex associated parameters according to an implicit indication of the configuration information 605, 606. As such, signaling overhead may be potentially reduced.

In an optional or additional aspect that may be combined with any other aspect, at block 1420, the method 1300 of FIG. 13 may include assigning a gap window between the full-duplex portion of the overlapping occasion and the half-duplex portion of the overlapping occasion, the gap window having a gap window duration of N symbols, wherein N is an integer greater than or equal to one. For example, in an aspect, the base station 102, the BS parameter switching component 188, and/or the assigning component 1240 may be configured to or may comprise means for assigning a gap window 730 between the full-duplex portion of the overlapping occasion and the half-duplex portion of the overlapping occasion, the gap window having a gap window duration of N symbols, wherein N is an integer greater than or equal to one.

For example, the assigning at block 1420 may include assigning the gap window duration, as described above in reference to FIG. 7.

In some aspects, the assigning at block 1120 may include receiving a value corresponding to the gap window duration.

In other optional or additional aspects, the assigning at block 1120 may include selecting the gap window duration according to a predefined rule.

Further, for example, the assigning at block 1420 may be performed to provide the UE 104 with time to effect the parameter switch between the overlapping full-duplex associated parameters and the non-overlapping half-duplex associated parameters.

In other optional or additional aspects, the assigning at block 1420 may include, at sub-block 1422, preventing transmissions during the gap window 730.

In other optional or additional aspects, the assigning at block 1420 may include, at sub-block 1424, transmitting data during the gap window 730.

In other optional or additional aspects, the assigning at block 1420 may include, at sub-block 1426, preventing reception of data during the gap window 730.

In other optional or additional aspects, the assigning at block 1420 may include, at sub-block 1428, receiving data during the gap window 730.

In an optional or additional aspect that may be combined with any other aspect, at block 1430, the method 1300 of FIG. 13 may include receiving an acknowledgement corresponding to the first receive occasion using half-duplex acknowledgement resources, the half-duplex acknowledgement resources having been indicated by the configuration information. For example, in an aspect, the base station 102, the BS parameter switching component 188, and/or the receiving component 1250 may be configured to or may comprise means for receiving an acknowledgement 830 corresponding to the first receive occasion 610A using half-duplex acknowledgement resources, the half-duplex acknowledgement resources having been indicated by the configuration information 606, 606.

For example, the receiving at block 1430 may include receiving the acknowledgement 830, as described above in reference to FIG. 8A.

Further, for example, the receiving at block 1430 may be performed to indicate to the network device 102 whether the UE 104 successfully received the first receive occasion 610A.

In an optional or additional aspect that may be combined with any other aspect, at block 1440, the method 1300 of FIG. 13 may include receiving an acknowledgement corresponding to the first receive occasion using full-duplex acknowledgement resources, the full-duplex acknowledgement resources having been indicated by the configuration information. For example, in an aspect, the base station 102, the BS parameter switching component 188, and/or the receiving component 1250 may be configured to or may comprise means for receiving an acknowledgement 860 corresponding to the first receive occasion 610A using full-duplex acknowledgement resources, the full-duplex acknowledgement resources having been indicated by the configuration information 605, 606.

For example, the transmitting at block 1440 may include receiving the acknowledgement 860, as described above in reference to FIG. 8B.

Further, for example, the receiving at block 1440 may be performed to indicate to the network device 102 whether the UE 104 successfully received the first receive occasion 610A.

Implementation examples are described in the following numbered clauses:

1. A method of wireless communication by a UE of a wireless communication network, comprising:
   receiving, from a base station, configuration information scheduling one or more receive occasions for the UE and one or more transmit occasions for the UE, wherein
      the one or more receive occasions comprise a first receive occasion,
      the one or more transmit occasions comprise a first transmit occasion,
      a full-duplex portion of an overlapping occasion comprises a portion of the first receive occasion overlapping with a portion of the first transmit occasion, and
      a half-duplex portion of the overlapping occasion comprises a remaining portion of the first receive occasion or a remaining portion of the first transmit occasion;
   performing full-duplex communications during the full-duplex portion of the overlapping occasion using overlapping full-duplex associated parameters; and
   performing half-duplex communications during the half-duplex portion of the overlapping occasion using non-overlapping half-duplex associated parameters, wherein the overlapping full-duplex associated parameters differ from the non-overlapping half-duplex associated parameters.

2. The method of clause 1, wherein the overlapping full-duplex associated parameters and the non-overlapping half-duplex associated parameters comprise at least one of a different beam, a different MCS, a different transmit power level, a different precoder, a different rank indicator, or a different TCI state.

3. The method of clause 1 or 2, further comprising:
   selecting the overlapping full-duplex associated parameters and the non-overlapping half-duplex associated parameters according to a predefined rule.

4. The method of any preceding clause 1 to 3, wherein receiving the configuration information comprises:
   receiving a first indication of one or more full-duplex associated parameters for the full-duplex portion of the overlapping occasion and a second indication of one or more half-duplex associated parameters for the half-duplex portion of the overlapping occasion;
   selecting the overlapping full-duplex associated parameters from the one or more full-duplex associated parameters; and
   selecting the non-overlapping half-duplex associated parameters from the one or more half-duplex associated parameters.

5. The method of any preceding clause 1 to 4, wherein receiving the configuration information comprises:
   receiving group common DCI indicating the overlapping full-duplex associated parameters and the non-overlapping half-duplex associated parameters, wherein the one or more receive occasions and the one or more transmit occasions are for a plurality of different UEs comprising the UE.

6. The method of any preceding clause 1 to 5, further comprising:
   receiving scheduling information that schedules a gap window between the full-duplex portion of the overlapping occasion and the half-duplex portion of the overlapping occasion, the gap window having a gap window duration of N symbols, wherein N is an integer greater than or equal to one.

7. The method of any preceding clause 1 to 6, further comprising at least one of:
   preventing transmissions during the gap window; or
   transmitting data during the gap window; or
   preventing reception of data during the gap window; or
   receiving data during the gap window.

8. The method of any preceding clause 1 to 7, wherein receiving the configuration information comprises:
   receiving a value corresponding to the gap window duration; or
   selecting the gap window duration according to a predefined rule.

9. The method of any preceding clause 1 to 8, further comprising:
   transmitting an acknowledgement corresponding to the first receive occasion using half-duplex acknowledgement resources, the half-duplex acknowledgement resources having been indicated by the configuration information.

10. The method of any preceding clause 1 to 9, further comprising:
    transmitting an acknowledgement corresponding to the first receive occasion using full-duplex acknowledgement resources, the full-duplex acknowledgement resources having been indicated by the configuration information.

11. The method of any preceding clause 1 to 10, wherein receiving the configuration information comprises:
    receiving scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion.

12. An apparatus of wireless communication by a UE of a wireless communication network, comprising a, and a processor coupled with the memory, the memory and the processor configured to perform one or more methods of any preceding clause 1 to 11.

13. An apparatus of wireless communication by a UE of a wireless communication network, comprising means for performing one or more methods of any preceding clause 1 to 11.

14. A computer-readable medium storing instructions of wireless communication by a UE of a wireless communication network, executable by a processor, to perform one or more methods of any preceding clause 1 to 11.

15. A method of wireless communication by a network node of a wireless communication network, comprising:
    transmitting, to a UE, configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion;

performing full-duplex communications during the full-duplex portion of the overlapping occasion using overlapping full-duplex associated parameters; and performing half-duplex communications during the half-duplex portion of the overlapping occasion using non-overlapping half-duplex associated parameters, wherein the overlapping full-duplex associated parameters differ from the non-overlapping half-duplex associated parameters.

16. The method of clause 15, wherein the overlapping full-duplex associated parameters and the non-overlapping half-duplex associated parameters comprise at least one of a different beam, a different MCS, a different transmit power level, a different precoder, a different rank indicator, or a different TCI state.

17. The method of clause 15 or 16, further comprising:
selecting the overlapping full-duplex associated parameters and the non-overlapping half-duplex associated parameters according to a predefined rule.

18. The method of any preceding clause 15 to 17, wherein transmitting the configuration information comprises:
transmitting a first indication of one or more full-duplex associated parameters for the full-duplex portion of the overlapping occasion and a second indication of one or more half-duplex associated parameters for the half-duplex portion of the overlapping occasion.

19. The method of any preceding clause 15 to 18, wherein transmitting the configuration information comprises:
transmitting group common DCI indicating the overlapping full-duplex associated parameters and the non-overlapping half-duplex associated parameters, wherein the one or more receive occasions and the one or more transmit occasions are for a plurality of different UEs comprising the UE.

20. The method of any preceding clause 15 to 19, further comprising:
assigning a gap window between the full-duplex portion of the overlapping occasion and the half-duplex portion of the overlapping occasion, the gap window having a gap window duration of N symbols, wherein N is an integer greater than or equal to one.

21. The method of any preceding clause 15 to 20, further comprising at least one of:
preventing transmissions during the gap window; or
transmitting data during the gap window; or
preventing reception of data during the gap window; or
receiving data during the gap window.

22. The method of any preceding clause 15 to 21, wherein transmitting the configuration information comprises:
transmitting a value corresponding to the gap window duration; or
selecting the gap window duration according to a predefined rule.

23. The method of any preceding clause 15 to 22, further comprising:
receiving an acknowledgement corresponding to the first receive occasion using half-duplex acknowledgement resources, the half-duplex acknowledgement resources having been indicated by the configuration information.

24. The method of any preceding clause 15 to 23, further comprising:
receiving an acknowledgement corresponding to the first receive occasion using full-duplex acknowledgement resources, the full-duplex acknowledgement resources having been indicated by the configuration information.

25. The method of any preceding clause 15 to 24, wherein transmitting the configuration information comprises:
transmitting scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion.

26. An apparatus of wireless communication by a network node of a wireless communication network, comprising a memory, and a processor coupled with the memory, the memory and the processor configured to perform one or more methods of any preceding clause 15 to 25.

27. An apparatus of wireless communication by a network node of a wireless communication network, comprising means for performing one or more methods of any preceding clause 15 to 25.

28. A computer-readable medium storing instructions of wireless communication by a network node of a wireless communication network, executable by a processor, to perform one or more methods of any preceding clause 15 to 25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) of a wireless communication network, comprising:
    receiving, from a base station, configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion, wherein receiving the configuration information comprises:
        receiving scheduling information that schedules a gap window between the full-duplex portion of the overlapping occasion and the half-duplex portion of the overlapping occasion, the gap window having a gap window duration of N symbols, wherein N is an integer greater than or equal to one, wherein the gap window is configured based on a predefined rule indicating at least one of the gap window duration or one or more gap window duration values based on one or more configuration parameters of a wireless communication system;
    performing full-duplex communications during the full-duplex portion of the overlapping occasion using overlapping full-duplex associated parameters; and
    performing half-duplex communications during the half-duplex portion of the overlapping occasion using non-overlapping half-duplex associated parameters,
    wherein the overlapping full-duplex associated parameters differ from the non-overlapping half-duplex associated parameters,
    wherein the full-duplex communications and the half-duplex communications are between the base station and the UE.

2. The method of claim 1, wherein the overlapping full-duplex associated parameters and the non-overlapping half-duplex associated parameters comprise at least one of a different beam, a different modulation and coding scheme (MCS), a different transmit power level, a different precoder, a different rank indicator, or a different transmission configuration indication (TCI) state.

3. The method of claim 1, further comprising:
    selecting the overlapping full-duplex associated parameters and the non-overlapping half-duplex associated parameters according to a predefined rule.

4. The method of claim 1, wherein receiving the configuration information comprises:
    receiving a first indication of one or more full-duplex associated parameters for the full-duplex portion of the overlapping occasion and a second indication of one or more half-duplex associated parameters for the half-duplex portion of the overlapping occasion;
    selecting the overlapping full-duplex associated parameters from the one or more full-duplex associated parameters; and
    selecting the non-overlapping half-duplex associated parameters from the one or more half-duplex associated parameters.

5. The method of claim 1, wherein receiving the configuration information comprises:
    receiving group common downlink configuration information (DCI) indicating the overlapping full-duplex associated parameters and the non-overlapping half-duplex associated parameters, wherein the one or more receive occasions and the one or more transmit occasions are for a plurality of different UEs comprising the UE.

6. The method of claim 1, further comprising at least one of:
    preventing transmissions during the gap window; or
    transmitting data during the gap window; or
    preventing reception of data during the gap window; or
    receiving data during the gap window.

7. The method of claim 1, wherein receiving the configuration information comprises:
    receiving a value corresponding to the gap window duration; or
    selecting the gap window duration according to a predefined rule.

8. The method of claim 1, further comprising:
    transmitting an acknowledgement corresponding to the first receive occasion using half-duplex acknowledgement resources, the half-duplex acknowledgement resources having been indicated by the configuration information.

9. The method of claim 1, further comprising:
    transmitting an acknowledgement corresponding to the first receive occasion using full-duplex acknowledgement resources, the full-duplex acknowledgement resources having been indicated by the configuration information.

10. The method of claim 1, wherein receiving the configuration information comprises:
    receiving scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion.

11. An apparatus of wireless communication by a user equipment (UE) of a wireless communication network, comprising:
a memory; and
a processor coupled with the memory, the memory and the processor configured to:
receive, from a base station, configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion, wherein to receive the configuration information, the memory and the processor are configured to:
receive scheduling information that schedules a gap window between the full-duplex portion of the overlapping occasion and the half-duplex portion of the overlapping occasion, the gap window having a gap window duration of N symbols, wherein N is an integer greater than or equal to one, wherein the gap window is configured based on a predefined rule indicating at least one of the gap window duration or one or more gap window duration values based on one or more configuration parameters of a wireless communication system;
perform full-duplex communications during the full-duplex portion of the overlapping occasion using overlapping full-duplex associated parameters; and
perform half-duplex communications during the half-duplex portion of the overlapping occasion using non-overlapping half-duplex associated parameters, wherein the overlapping full-duplex associated parameters differ from the non-overlapping half-duplex associated parameters,
wherein the full-duplex communications and the half-duplex communications are between the base station and the UE.

12. The apparatus of claim 11, wherein the overlapping full-duplex associated parameters and the non-overlapping half-duplex associated parameters comprise at least one of a different beam, a different modulation and coding scheme (MCS), a different transmit power level, a different precoder, a different rank indicator, or a different transmission configuration indication (TCI) state.

13. The apparatus of claim 11,
wherein the apparatus further comprises an antenna panel; and
wherein to receive the configuration information, the memory and the processor are configured to:
receive, via the antenna panel, a first indication of one or more full-duplex associated parameters for the full-duplex portion of the overlapping occasion and a second indication of one or more half-duplex associated parameters for the half-duplex portion of the overlapping occasion;
select the overlapping full-duplex associated parameters from the one or more full-duplex associated parameters; and
select the non-overlapping half-duplex associated parameters from the one or more half-duplex associated parameters.

14. A method of wireless communication by a network node of a wireless communication network, comprising:
transmitting, to a user equipment (UE), configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion;
assigning a gap window between the full-duplex portion of the overlapping occasion and the half-duplex portion of the overlapping occasion, the gap window having a gap window duration of N symbols, wherein N is an integer greater than or equal to one, wherein the gap window is configured based on a predefined rule indicating at least one of the gap window duration or one or more gap window duration values based on one or more configuration parameters of a wireless communication system;
performing full-duplex communications during the full-duplex portion of the overlapping occasion using overlapping full-duplex associated parameters; and
performing half-duplex communications during the half-duplex portion of the overlapping occasion using non-overlapping half-duplex associated parameters, wherein the overlapping full-duplex associated parameters differ from the non-overlapping half-duplex associated parameters,
wherein the full-duplex communications and the half-duplex communications are between the network node and the UE.

15. The method of claim 14, wherein the overlapping full-duplex associated parameters and the non-overlapping half-duplex associated parameters comprise at least one of a different beam, a different modulation and coding scheme (MCS), a different transmit power level, a different precoder, a different rank indicator, or a different transmission configuration indication (TCI) state.

16. The method of claim 14, further comprising:
selecting the overlapping full-duplex associated parameters and the non-overlapping half-duplex associated parameters according to a predefined rule.

17. The method of claim 14, wherein transmitting the configuration information comprises:
transmitting a first indication of one or more full-duplex associated parameters for the full-duplex portion of the overlapping occasion and a second indication of one or more half-duplex associated parameters for the half-duplex portion of the overlapping occasion.

18. The method of claim 14, wherein transmitting the configuration information comprises:
transmitting group common downlink configuration information (DCI) indicating the overlapping full-duplex associated parameters and the non-overlapping half-duplex associated parameters, wherein the one or more receive occasions and the one or more transmit occasions are for a plurality of different UEs comprising the UE.

19. The method of claim 14, further comprising at least one of:
preventing transmissions during the gap window; or
transmitting data during the gap window; or
preventing reception of data during the gap window; or
receiving data during the gap window.

20. The method of claim 14, wherein transmitting the configuration information comprises:
transmitting a value corresponding to the gap window duration; or
selecting the gap window duration according to a predefined rule.

21. The method of claim 14, further comprising:
receiving an acknowledgement corresponding to the first receive occasion using half-duplex acknowledgement resources, the half-duplex acknowledgement resources having been indicated by the configuration information.

22. The method of claim 14, further comprising:
receiving an acknowledgement corresponding to the first receive occasion using full-duplex acknowledgement resources, the full-duplex acknowledgement resources having been indicated by the configuration information.

23. The method of claim 14, wherein transmitting the configuration information comprises:
transmitting scheduling information that schedules a second receive occasion of the one or more receive occasions overlapping a second transmit occasion of the one or more transmit occasions, the second receive occasion having a first start time that matches a second start time of the second transmit occasion, and the second receive occasion having a first end time that matches a second end time of the second transmit occasion.

24. An apparatus of wireless communication by a network node of a wireless communication network, comprising:
a memory; and
a processor coupled with the memory, the memory and the processor configured to:
transmit, to a user equipment (UE), configuration information scheduling one or more receive occasions for the UE and one or more transmit occasions for the UE, wherein the one or more receive occasions comprise a first receive occasion, the one or more transmit occasions comprise a first transmit occasion, a full-duplex portion of an overlapping occasion comprises a portion of the first receive occasion overlapping with a portion of the first transmit occasion, and a half-duplex portion of the overlapping occasion comprises a remaining portion of the first receive occasion or a remaining portion of the first transmit occasion;
assign a gap window between the full-duplex portion of the overlapping occasion and the half-duplex portion of the overlapping occasion, the gap window having a gap window duration of N symbols, wherein N is an integer greater than or equal to one, wherein the gap window is configured based on a predefined rule indicating at least one of the gap window duration or one or more gap window duration values based on one or more configuration parameters of a wireless communication system;
perform full-duplex communications during the full-duplex portion of the overlapping occasion using overlapping full-duplex associated parameters; and
perform half-duplex communications during the half-duplex portion of the overlapping occasion using non-overlapping half-duplex associated parameters, wherein the overlapping full-duplex associated parameters differ from the non-overlapping half-duplex associated parameters,
wherein the full-duplex communications and the half-duplex communications are between the network node and the UE.

25. The apparatus of claim 24, wherein the overlapping full-duplex associated parameters and the non-overlapping half-duplex associated parameters comprise at least one of a different beam, a different modulation and coding scheme (MCS), a different transmit power level, a different precoder, a different rank indicator, or a different transmission configuration indication (TCI) state.

26. The apparatus of claim 24,
wherein the apparatus further comprises an antenna panel; and
wherein to transmit the configuration information, the memory and the processor are configured to:
transmit, via the antenna panel, a first indication of one or more full-duplex associated parameters for the full-duplex portion of the overlapping occasion and a second indication of one or more half-duplex associated parameters for the half-duplex portion of the overlapping occasion.

* * * * *